United States Patent
Oshel et al.

(10) Patent No.: US 11,664,711 B2
(45) Date of Patent: May 30, 2023

(54) METHOD AND SYSTEM FOR ASSEMBLING HAIRPIN CONDUCTORS WITH A STATOR CORE

(71) Applicant: ATS CORPORATION, Cambridge (CA)

(72) Inventors: Glenn Oshel, Wixom, MI (US); James MacKinlay, Cambridge (CA); Fred Egge, Holland, MI (US); Dan McCauley, Holland, MI (US)

( * ) Notice: Subject to any disclaimer, the term of this patent is extended or adjusted under 35 U.S.C. 154(b) by 334 days.

(21) Appl. No.: 16/290,359

(22) Filed: Mar. 1, 2019

(65) Prior Publication Data

US 2019/0199184 A1   Jun. 27, 2019

Related U.S. Application Data

(63) Continuation of application No. PCT/CA2017/051041, filed on Sep. 5, 2017.

(Continued)

(51) Int. Cl.
*H02K 15/06* (2006.01)
*H02K 1/16* (2006.01)
(Continued)

(52) U.S. Cl.
CPC ............. *H02K 15/064* (2013.01); *H02K 1/16* (2013.01); *H02K 3/12* (2013.01); *H02K 3/48* (2013.01); *H02K 3/345* (2013.01); *Y10T 29/4913* (2015.01)

(58) Field of Classification Search
CPC .......... H02K 15/064; H02K 1/16; H02K 3/12; H02K 3/48; H02K 3/345; H02K 15/005; H01R 43/01

(Continued)

(56) References Cited

U.S. PATENT DOCUMENTS 7,185,413 B2 * 3/2007 Kuroyanagi ....... H02K 15/0442
  29/736
7,243,414 B2 * 7/2007 Even .................... H02K 15/064
  29/760

(Continued)

FOREIGN PATENT DOCUMENTS

FR         2841402 A1     12/2003
JP      2013102569 A  *   5/2013

(Continued)

OTHER PUBLICATIONS

Canadian Intellectual Property Office as International Searching Authority, International Search Report for PCT/CA2017/051041, dated Dec. 4, 2017.

(Continued)

*Primary Examiner* — Peter Dungba Vo
*Assistant Examiner* — Azm A Parvez
(74) *Attorney, Agent, or Firm* — Amarok IP Inc.; Neil W. Henderson

(57) ABSTRACT

A method and system of assembling hairpin conductors with a stator core, the system and method including: arranging the plurality of hairpin conductors into two or more sub-assembly fixtures, wherein the plurality of hairpin conductors are arranged in the two or more sub-assembly fixtures in two or more layers; activating a retaining mechanism to hold the plurality of hairpin conductors in place within the sub-assembly fixtures; meshing the two or more sub-assembly fixtures together to bring the hairpin conductors into alignment and form a layered conductor assembly; introducing the layered conductor assembly into the stator core by advancing the two or more sub-assembly fixtures in relation to the stator core in alignment with the locations on the stator core for the layered conductor assembly; and at an appropriate timing, deactivating the retaining mechanism to (Continued)

release the layered conductor assembly from the two or more sub-assembly fixtures.

11 Claims, 33 Drawing Sheets

Related U.S. Application Data

(60) Provisional application No. 62/383,033, filed on Sep. 2, 2016.

(51) Int. Cl.
*H02K 3/12* (2006.01)
*H02K 3/48* (2006.01)
*H02K 3/34* (2006.01)

(58) Field of Classification Search
USPC .......................................................... 29/596
See application file for complete search history.

(56) References Cited

U.S. PATENT DOCUMENTS

| | | | |
|---|---|---|---|
| 7,941,910 B2 | 5/2011 | Guercioni | |
| 8,127,430 B2 | 3/2012 | Moriguchi et al. | |
| 9,214,843 B2 | 12/2015 | Jung | |
| 2004/0187293 A1 | 9/2004 | Bradfield | |
| 2009/0178270 A1* | 7/2009 | Guercioni | H02K 15/0428 29/598 |
| 2013/0300232 A1 | 11/2013 | Jung | |
| 2013/0300248 A1 | 11/2013 | Ishida | |
| 2014/0090240 A1 | 4/2014 | Ponzio et al. | |
| 2015/0084448 A1 | 3/2015 | Nonaka | |
| 2015/0214820 A1 | 7/2015 | Geoffrion | |

FOREIGN PATENT DOCUMENTS

| | | |
|---|---|---|
| JP | 2013102569 A | 5/2013 |
| JP | 2014023184 A | 2/2014 |

OTHER PUBLICATIONS

Canadian Intellectual Property Office as International Searching Authority, International Preliminary Report on Patentability for PCT/CA2017/051041, dated Mar. 5, 2019.

Extended European Search Report, European Patent Office, on corresponding EP Application No. 17844758.7, dated May 12, 2020.

Article 94(3) Office Action, European Patent Office, corresponding European Application No. 17844758.7, dated Feb. 17, 2022.

* cited by examiner

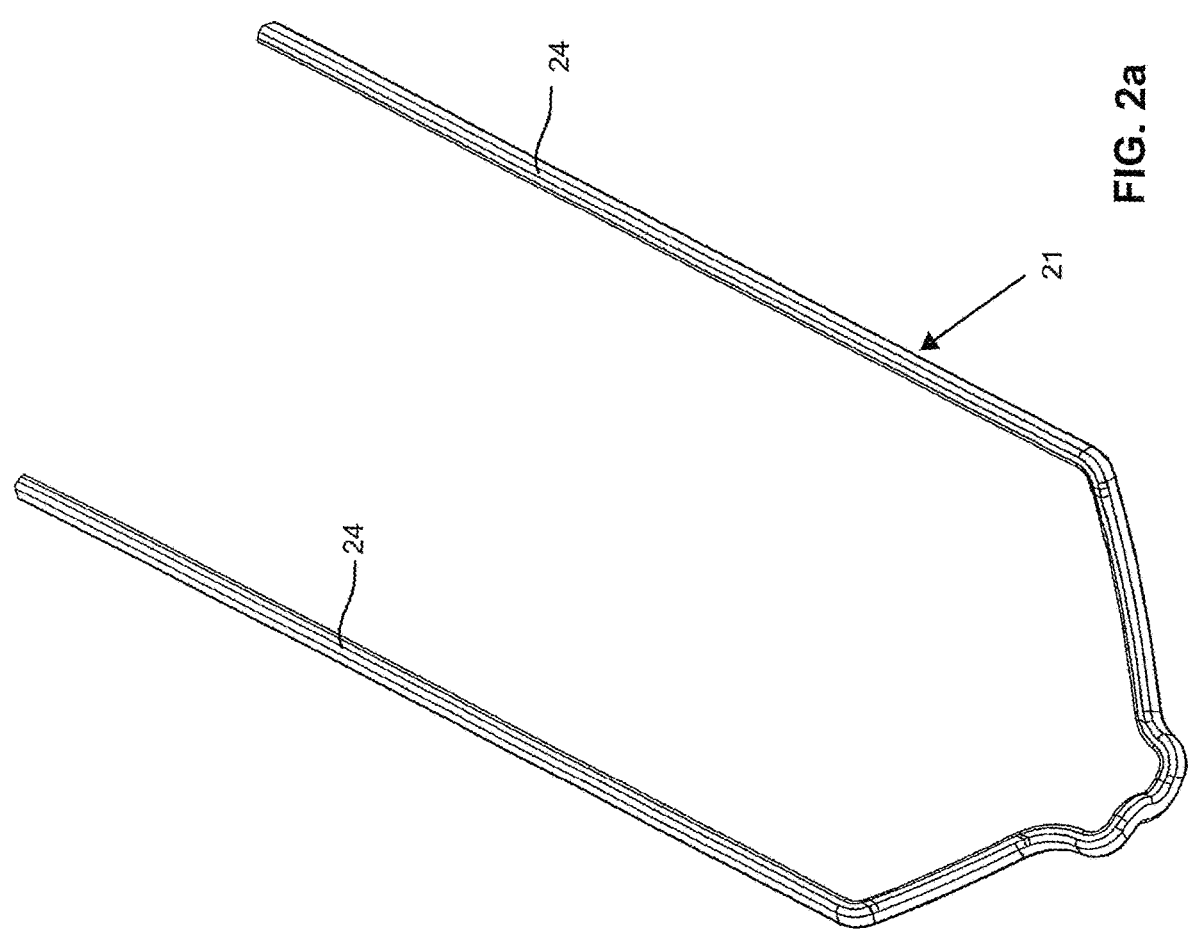

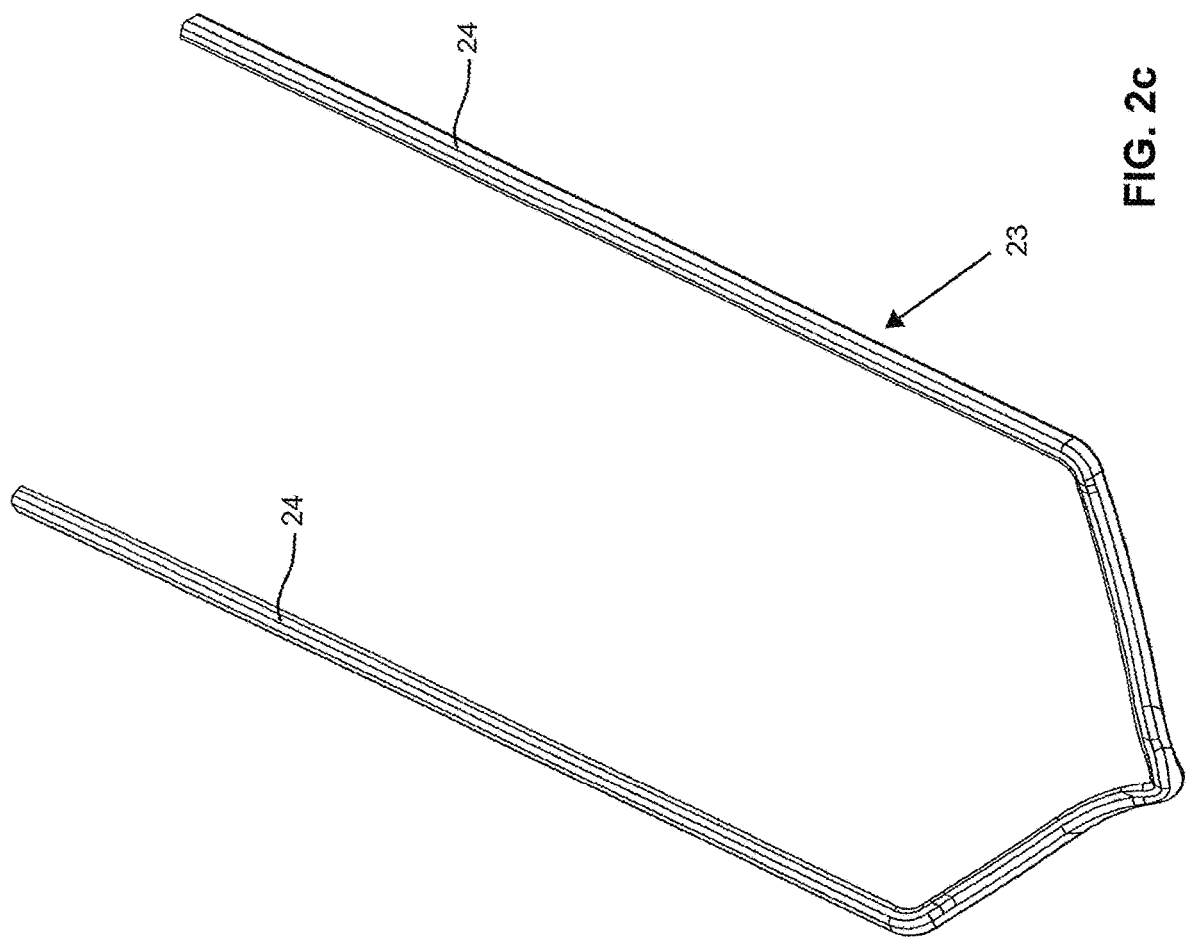

METHOD AND SYSTEM FOR ASSEMBLING HAIRPIN CONDUCTORS WITH A STATOR CORE

RELATED APPLICATIONS

This is a formal application based on and claiming the benefit of U.S. Provisional Application No. 62/383,033, filed Sep. 2, 2016, which is hereby incorporated herein by reference.

FIELD

The embodiments disclosed herein relate to the assembly of stator cores, and, in particular to a method and system for arranging and inserting hairpin conductors into a stator core.

INTRODUCTION

Stator coils are used in various types of motors and involve a plurality of overlapping wires arranged in a predetermined pattern (sometimes called a "winding" or "weave") to obtain the desired result for the stator core and motor.

The arrangement of the overlapping wires and the insertion of the overlapping wires into the stator core has generally been considered a difficult process to automate because of the thinness of the wires, the detailed arrangement of the wires needed and the difficulty involved in inserting wires into the stator core in a precise arrangement and alignment. In some cases, the overlapping wires are referred to as hairpin conductors.

As such, there is a need for an improved system and method for inserting hairpin conductors into a stator core that overcomes at least one of the issues with conventional systems.

SUMMARY

The disclosure is generally directed at automating a method of inserting a set of hairpin conductors into a stator core. Hairpin conductor insertion involves the weaving of a plurality of hairpin conductors (preferably U-shaped rectangular wires) into two or more layers and then pressing them concurrently into a set of paper-lined slots arranged radially around a laminate stator core. A set of jumper wires are woven between the layers to connect them. A set of non-U-shaped wires (leads) are also installed.

According to one aspect herein, there is provided a method of assembling a plurality of hairpin conductors with a stator core, the method including: arranging the plurality of hairpin conductors into two or more sub-assembly fixtures, wherein the plurality of hairpin conductors are arranged in the two or more sub-assembly fixtures in two or more layers; activating a retaining mechanism to hold the plurality of hairpin conductors in place within the sub-assembly fixtures; meshing the two or more sub-assembly fixtures together to bring the hairpin conductors into alignment and form a layered conductor assembly; introducing the layered conductor assembly into the stator core by advancing the two or more sub-assembly fixtures toward the stator core in alignment with the locations on the stator core for the layered conductor assembly; and after introducing the layered conductor assembly into the stator core, deactivating the retaining mechanism to release the layered conductor assembly from the two or more sub-assembly fixtures.

In some cases, the arranging may include: placing a first layer of the plurality of hairpin conductors within at least one of the two or more sub-assembly fixtures; and arranging at least another layer of the plurality of hairpin conductors within at least another one of the two or more sub-assembly fixtures. In this case, the layers of hairpin conductors may be layered in accordance with a predetermined design of the stator core.

In some other cases, the meshing may include axially sliding the two or more sub-assembly fixtures towards each other along a predetermined angle of approach.

In still other cases, the introducing may include pushing the layered conductor assembly toward the stator core such that individual hairpin conductors enter into designated positions on the stator core.

In yet another case, the method may further include: partially inserting the layered conductor assembly into the stator core while the sub-assembly fixtures are meshed together; removing the sub-assembly fixtures; and fully inserting the layered conductor assembly fully into the stator core after removing the sub-assembly fixtures. In this case, the removing may include radially separating the sub-assembly fixtures.

According to another aspect herein, there is provided a system for assembling a plurality of hairpin conductors with a stator core, the system including: two or more sub-assembly fixtures for receiving the plurality of hairpin conductors, wherein each of the two or more sub-assembly fixtures are configured to mesh with one another to bring the hairpin conductors into alignment and produce a layered conductor assembly; a retaining mechanism comprising: an activated state for holding the plurality of hairpin conductors in place within the sub-assembly fixtures while forming the layered conductor assembly; and a deactivated state for releasing the plurality of hairpin conductors after the layered conductor assembly is introduced into the stator core.

In a particular case, the system may further include a movement apparatus for moving the meshed two or more sub-assembly fixtures toward the stator core such that the layered conductor assembly is introduced into the stator core. In this case, the movement apparatus may include a pressure plate for urging the two or more sub-assembly fixtures and the layered conductor assembly towards the stator core such that the layered conductor assembly is inserted to designated slots on the stator core.

In another case, the system may further include a fixture assembly actuator for: meshing the two or more sub-assembly fixtures together to form the layered conductor assembly; and retracting the two or more sub-assembly fixtures after introducing the layered conductor assembly into the stator core.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of systems, methods, and apparatuses of the present specification. In the drawings:

FIGS. 2*a*-2*c* are perspective views of jumper, lead and standard hairpin conductors;

DETAILED DESCRIPTION

Various systems, apparatuses or processes will be described below to provide an example of embodiments of the disclosure. No embodiment described below is intended to limit any claimed subject matter and any claimed subject matter may cover systems, processes or apparatuses that differ from those described below. The disclosure is not limited to apparatuses or processes having all of the features of any one system, apparatus or process described below or to features common to multiple or all of the systems, apparatuses or processes described below. It is possible that a system, apparatus or process described below is not an embodiment of any claimed subject matter. Any disclosure disclosed below that is not claimed in this document may be the subject of another protective instrument, for example, a continuing patent application, and the applicants, inventors or owners do not intend to abandon, disclaim or dedicate to the public any such subject matter by its disclosure in this document.

Figure 1:
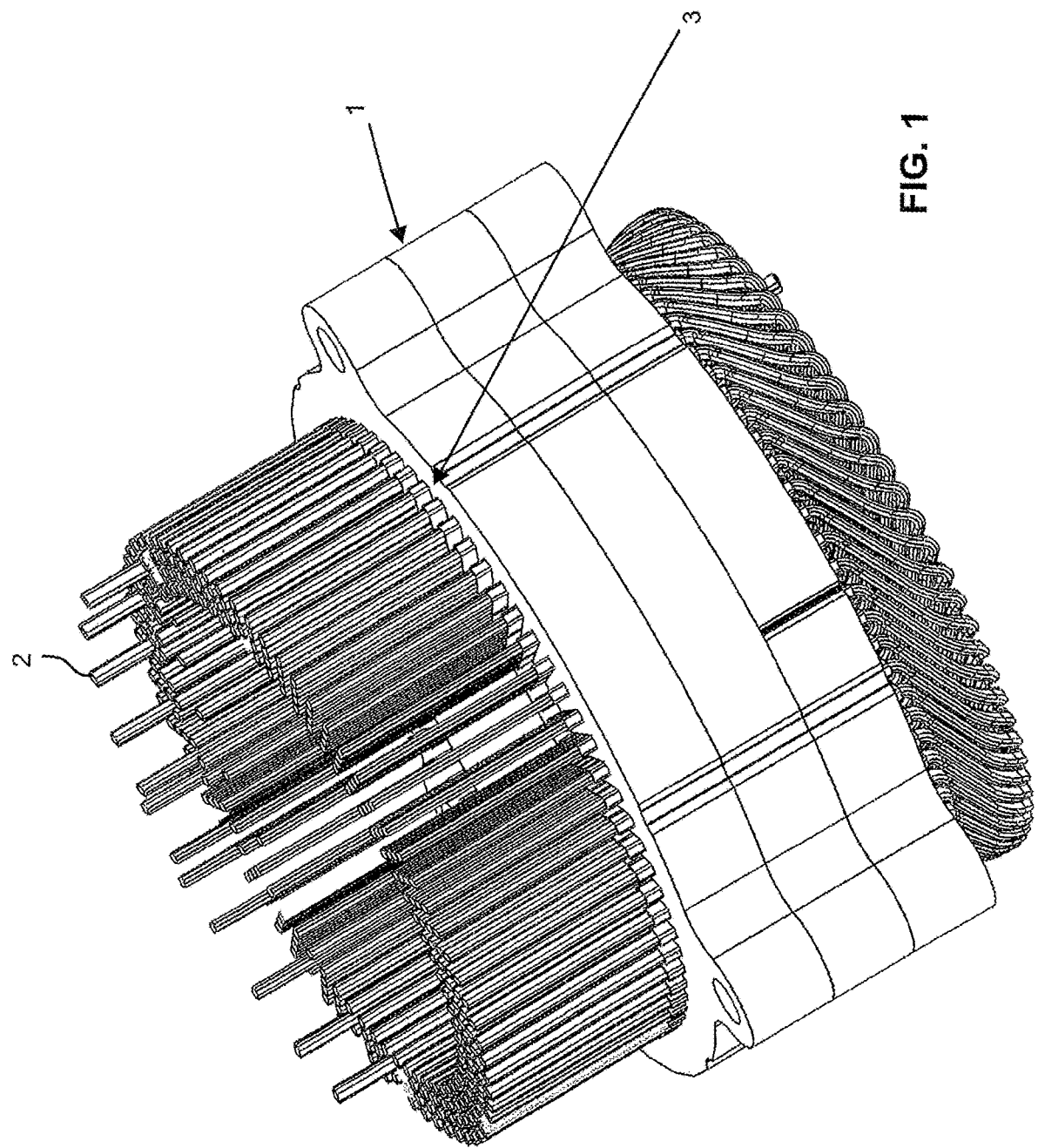
FIG. 1 is a perspective view of a stator core, insulators, and complete set of hairpin conductors.
Figure 2B:
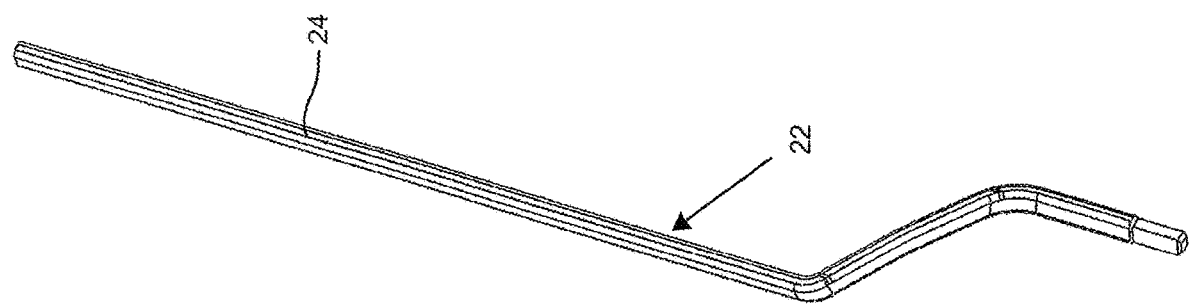
Figure 3:
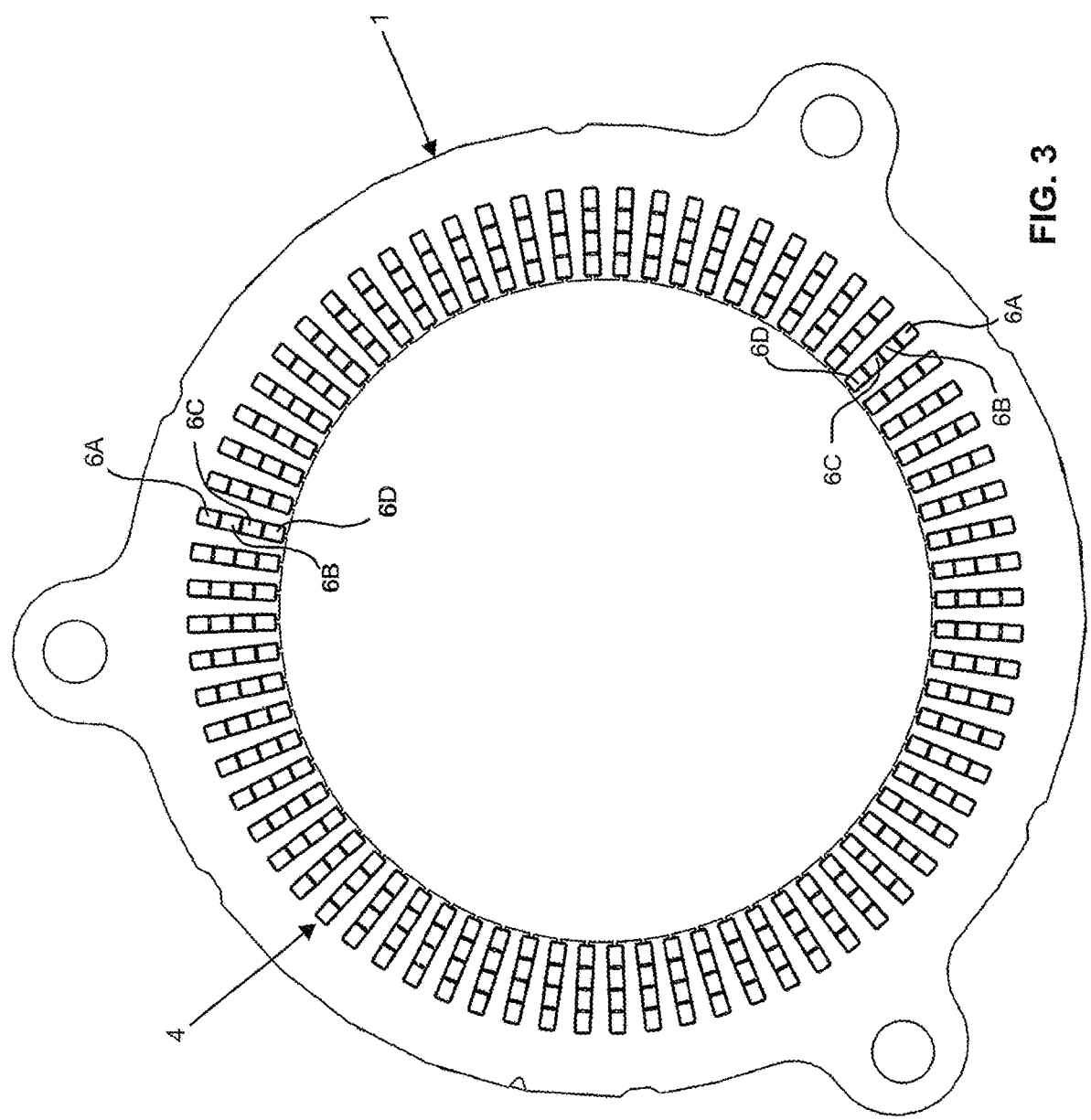
FIG. 3 is cross-sectional view taken along the line 3-3 of FIG. 1.
Figure 4:
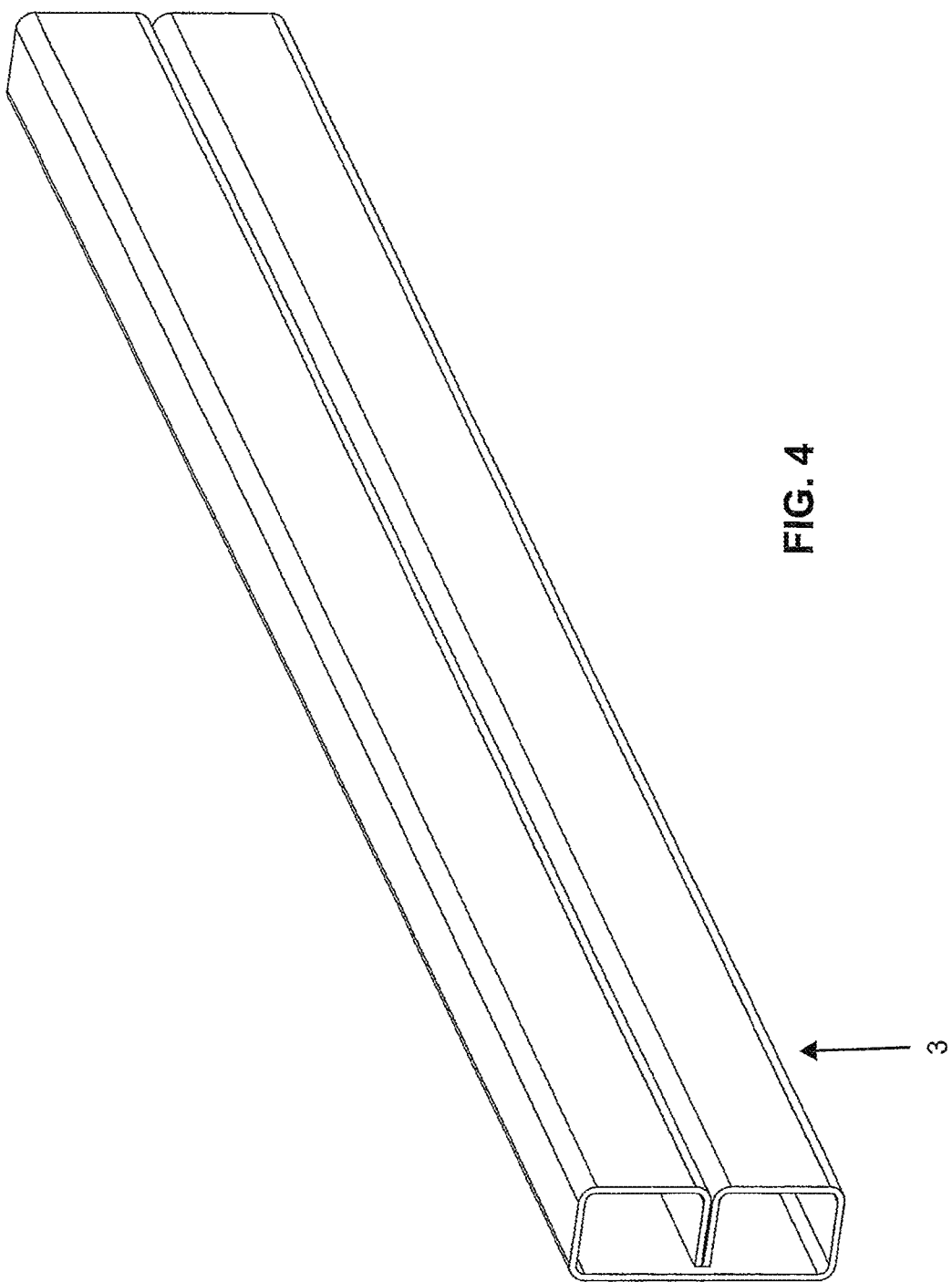
FIG. 4 is a perspective view of an insulator.

Referring to FIG. 1 and FIG. 3, a perspective view and a top view of a stator core (1) with a set of hairpin conductors (sometimes referred to as a layered conductor assembly) are shown. The stator core (1) includes a plurality of slots (4) arranged in a circular fashion about the center of the stator core (1) for receiving the plurality of hairpin conductors individually (2). The number of slots (4) and the length of these slots (4) may vary significantly depending on the design of the core. Within each of the slots (4) is an insulator (3), such as a paper insulator, which is used to insulate the hairpin conductor within the slot (4). A perspective view of one embodiment of an insulator (3) is shown in FIG. 4. These paper insulators (3) also assist to constrain or hold the hairpin conductors in place within the core (1). In some embodiments, the design of the insulators (3) may be such as to insulate one or more pairs of hairpin conductor ends. Examples of different hairpin conductor ends are shown in FIG. 2 and numbered as (21, 22, 23). FIG. 2 shows jumper (21), lead (22) and standard (23) hairpin conductors.

The hairpin conductors may be arranged in circular layers (6) to form a layered conductor assembly for placing within the slots (4) such as schematically shown in FIG. 3. In the current embodiment, the layered conductor assembly includes four layers (6a, 6b, 6c and 6d), although it will be understood that a different number of layers may be contemplated. The layers may be seen as layer 1 (6a), layer 2 (6b), layer 3 (6c) and layer 4 (6d). Each of these layers (6) may represent one or more of the arms (24) of the hairpin conductors (21, 22 or 23) of FIG. 2. This will be described in more detail below.

In some embodiments of the layered conductor assembly (2), a standard hairpin conductor (23) spans two adjoining layers across a plurality of slots circumferentially. Depending on the diameter and the total number of layers within the stator core, a plurality of standard hairpin conductor (23) sizes may be required. The hairpin conductors (2) also include hairpin conductor leads (22). For each pair of layers in the layered conductor assembly, a predetermined number, such as six, hairpin conductor leads (22) are required. Hairpin conductor leads (22) differ from standard hairpin conductors in that they are a single strand, that is, one arm (24) rather than two arms (24). Hairpin conductor jumpers (21) are configured to join pairs of layers (6).

As mentioned above, standard hairpin conductors (23) may span two adjacent layers, for example layer 1 and 2 or layer 3 and 4 while hairpin conductor jumpers (21) join the layer pairs by spanning between layers 2 and 3.

In order to insert or integrate the layered conductor assembly (2) within the stator core (1), hairpin conductor sub-assemblies, or sub-assembly fixtures, are used to assemble the layered conductor assembly (2) before being inserted into the stator core. This is preferably performed in an automated manner. Once the hairpin conductors are in the sub-assembly fixtures, the insertion of the layered conductor assembly (2) into the slots of the stator core may be achieved by moving the entire layered conductor assembly into a stationary stator core or by moving the stator core over a stationary layered conductor assembly.

Figure 8:
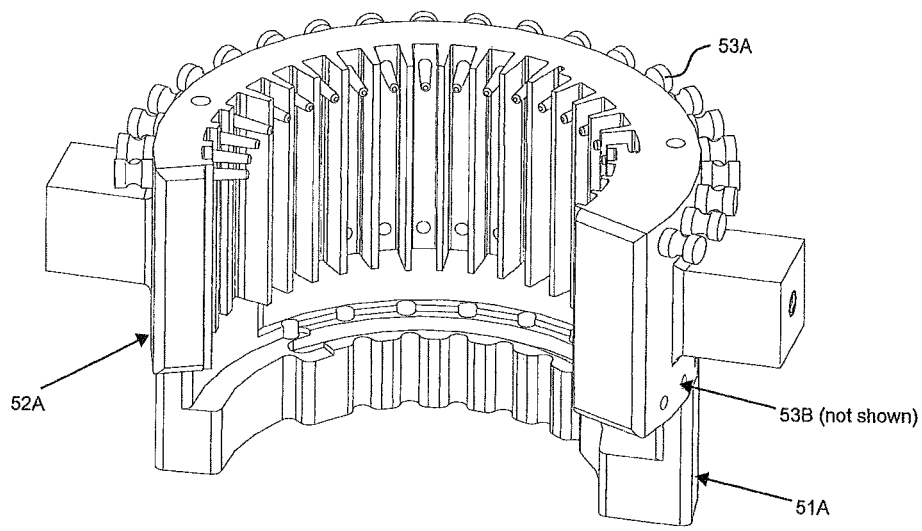
FIG. 8 is a perspective view of one of the sub-assembly fixtures.

Referring to FIG. 8, a perspective view of an apparatus including a sub-assembly fixture (52A) and support/press plate (51A) is provided. In some embodiments, a diameter of the apparatus is varied to match the design of the stator core (1) or stator core assembly. It is preferred that the innermost diameter be void of any physical nesting, but it is presumed that some variations may require such nesting. Additionally, the design of the support/press plate (51A) may vary to match the configuration of the crown end of the layered conductor assembly (2).

Each sub-assembly fixture (52A, 52B) can include a retaining mechanism (53) to hold the hairpin conductors (2) in place while being arranged in the sub-assembly fixtures (52A, 52B). In this particular embodiment, the retaining mechanism includes horizontal rows of retaining pins (53A, 53B) that can be retracted radially. The pins (53A, 53B) are spaced to align with the radial spacing of the slots (4) of the stator core (1). In use, the pins hold the hairpin conductors (21, 22, 23) within the sub-assembly fixture (52A, 52B) during the arranging process described below and assist in holding the finished arrangement of hairpin conductors during the meshing of sub-assembly fixtures and positioning into the press fixture.

Figure 15:
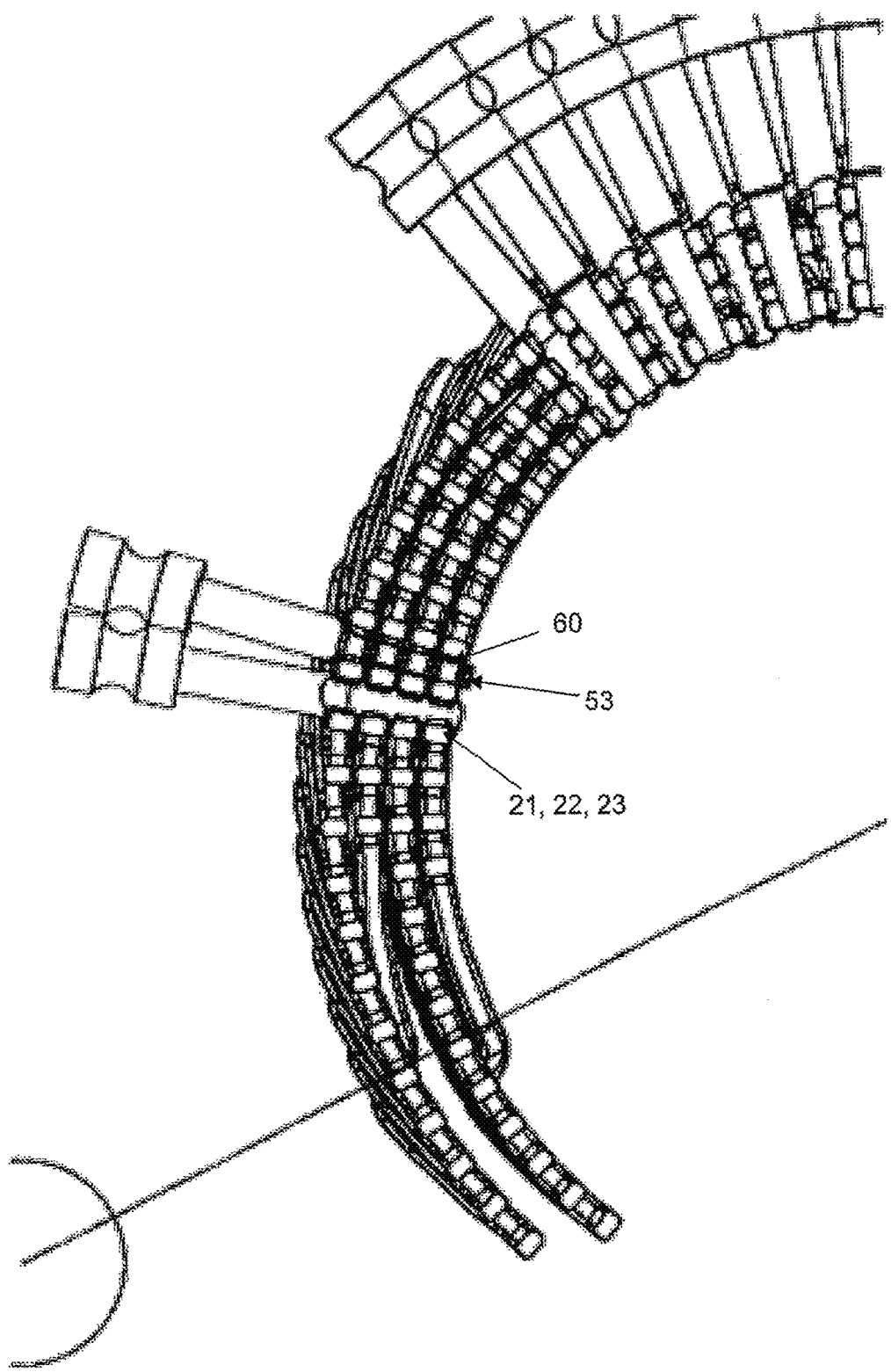
FIG. 15 is a plan view of the rotating retaining pins.

The retaining pins (53) are depicted in more detail in FIG. 15. The end of each pin is preferably tapered to match the spacing of hairpin conductor ends (21, 22, 23). The pins may include a set of two or more notches (60) corresponding to the number of layers of hairpin conductors that are to be received by the sub-assembly fixture (52a). The geometry, size, and spacing of the notches (60) correspond to the assembled layered conductor assembly (2) relative to the number of layers, the circumferential and axial spacing, and the size of the wires.

In one embodiment, the notches are on two opposing sides of the tapered diameter of the pins. Roughly perpendicular, or ninety degrees, from the set of notches (60) is a milled flat that is of a sufficient, or preferred, relief to allow the pin (53) to be radially retracted, when necessary, outwardly without damaging the hairpin conductors (21, 22, 23).

In some embodiments, it may not be necessary to have one pin for each gap in the hairpin conductors and there may be a reduced number of pins sufficient to hold at least one arm of each hairpin conductor in place. In a similar way, some retaining pins (53) may not have notches (60) and may act as spacers or the like to support the hairpin conductors (21, 22, 23) in position.

Figure 9:
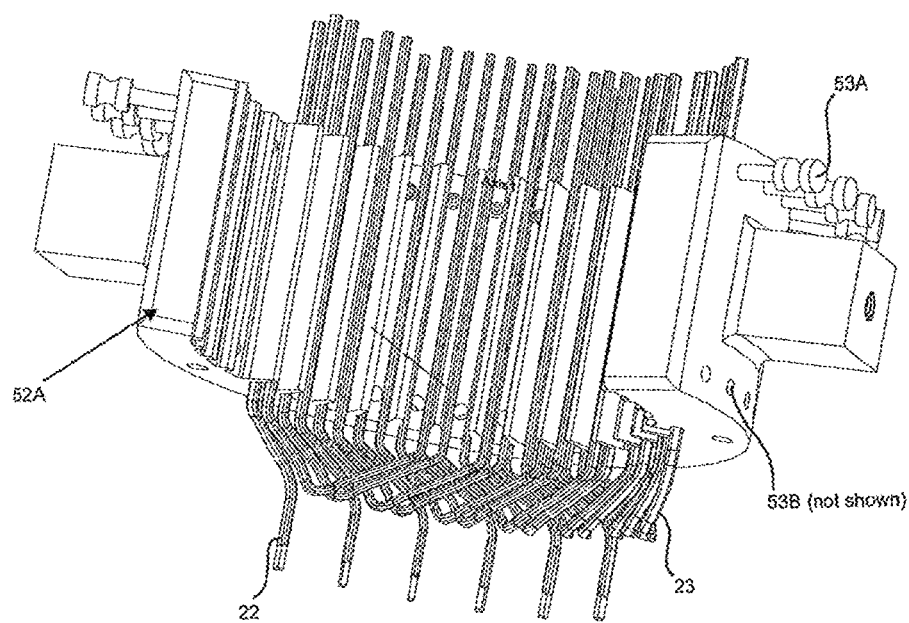
FIG. 9 is a perspective view of the fixture of FIG. 8 with one layer of hairpin conductors.
Figure 10:
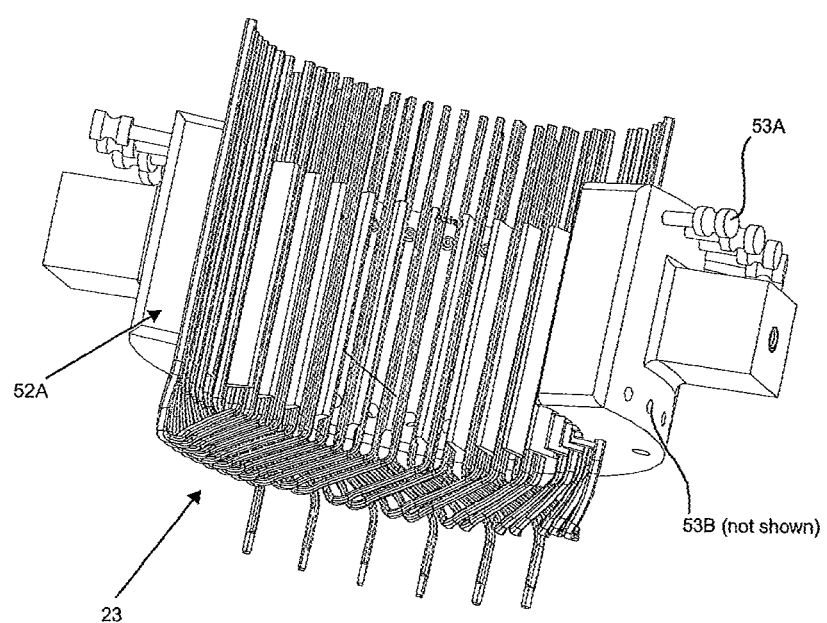
FIG. 10 is a perspective view of the fixture of FIG. 8 with two layers of hairpin conductors.
Figure 11:
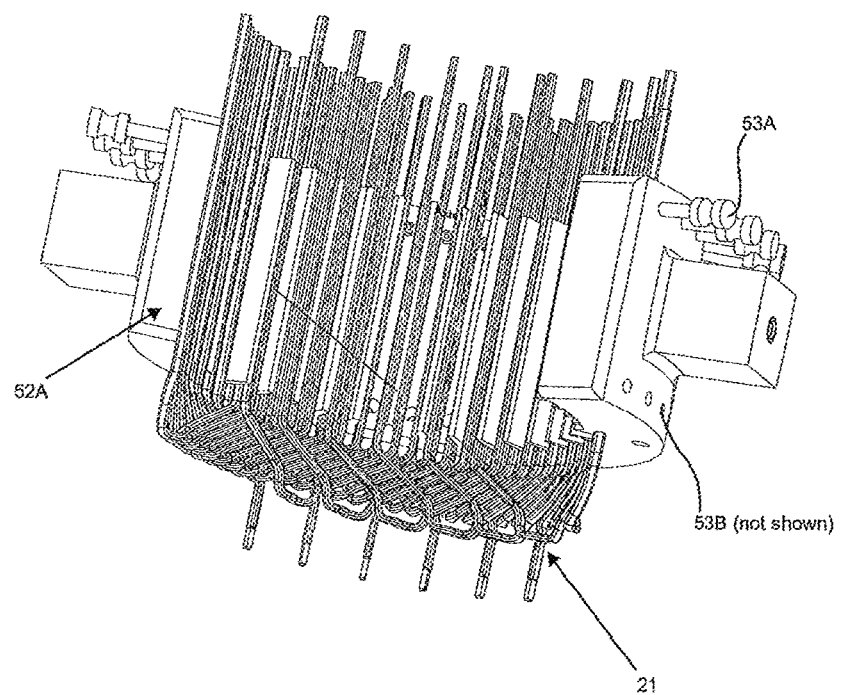
FIG. 11 is a perspective view of the fixture of FIG. 8 with three layers of hairpin conductors.
Figure 12:
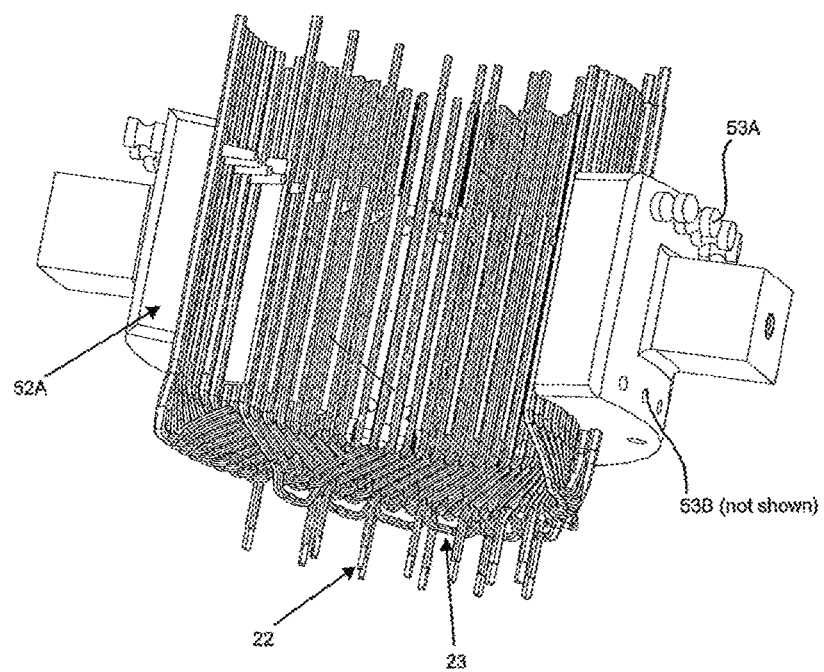
FIG. 12 is a perspective view of the fixture of FIG. 8 with four layers of hairpin conductors.

Turning to FIGS. 9 to 12, one embodiment of how hairpin conductors may be sequentially arranged within a sub-assembly fixture is shown. FIG. 9 shows a first layer of hairpin conductors being arranged within the sub-assembly fixture while FIGS. 10 to 12 show the addition of subsequent layers of hairpin conductors. These figures show an example of one segment of the layered conductor assembly (2) being arranged (for one sub-assembly fixture), but it is understood that the process is similar for all segments of the sub-assembly fixtures. It may be useful to arrange the hairpin conductors when the sub-assembly fixture (52A) is laid in a horizontal axis.

Initially, all of the retaining pins (53) are urged inward with the notch (60) of each pin in a position such that it is not engaging the hairpin conductors (21, 22, 23). In other words, the pins are rotated such that the notches are out of the way of the direction of hairpin conductor insertion. This provides sufficient clearance for the hairpin conductors to be placed into the sub-assembly fixture without interference.

FIG. 9 shows an outermost, or first, layer of standard hairpin conductors (23) and outer layer leads (22) being laid individually into the sub-assembly fixture (52A). In a preferred embodiment, the conductors are laid in a first direction from right to left with respect to the figure. However, the sequence of individual placement and the direction of placement of the hairpin conductors is dependent on the design of the stator assembly and remains within the scope of this disclosure.

In some embodiments, it may be necessary to pre-position the support/press plate (51A) to support the hairpin conductor leads (22). The position of each hairpin conductor is generally maintained by way of the retaining pins (53A, 53B). In this embodiment, there is an upper set of pins (53A) together with a lower set of pins (53B) configured to maintain rough axial alignment of the hairpin conductors.

Subsequently, as shown in FIG. 10, a second layer of standard hairpin conductors are weaved into the sub-assembly fixture, preferably in the first direction. Again, the sequence and direction of placement of the hairpin conductors is dependent on the stator core design.

Referring to FIG. 11, the hairpin conductor jumpers (21) connecting the second layer to the third layer are individually placed in a second direction (opposite the first direction) from left to right into the sub-assembly fixture. The placement of the jumpers in the second direction enables the weaving pattern of the completed layered conductor assembly (2). As before, the extended set of retaining pins (53A, 53B) assist to provide the required spacing of the individual hairpin conductor jumpers (21).

FIG. 12 depicts the placement of more standard hairpin conductors (21) and hairpin conductor leads (22) arranged individually in the first direction. These standard conductors and conductor leads form the third and fourth layers.

Figure 13:
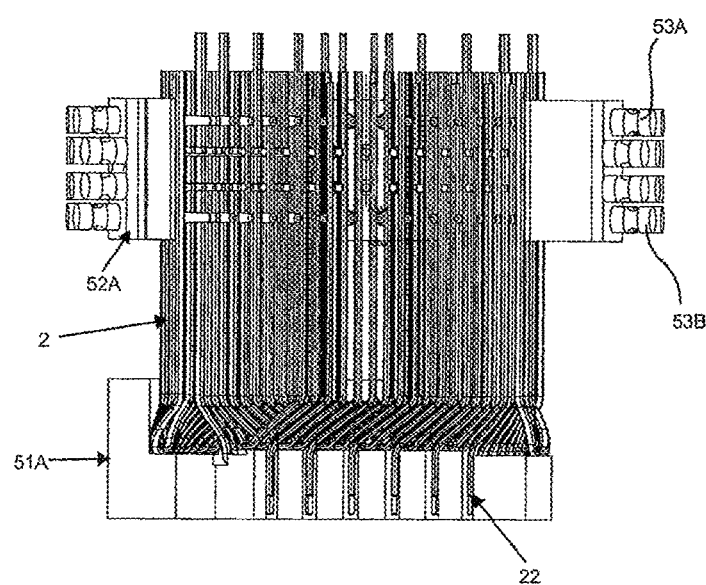
FIG. 13 is a cross-section of the fixture of FIG. 8 with four layers of hairpin conductors and pusher fixture in place.
Figure 14:
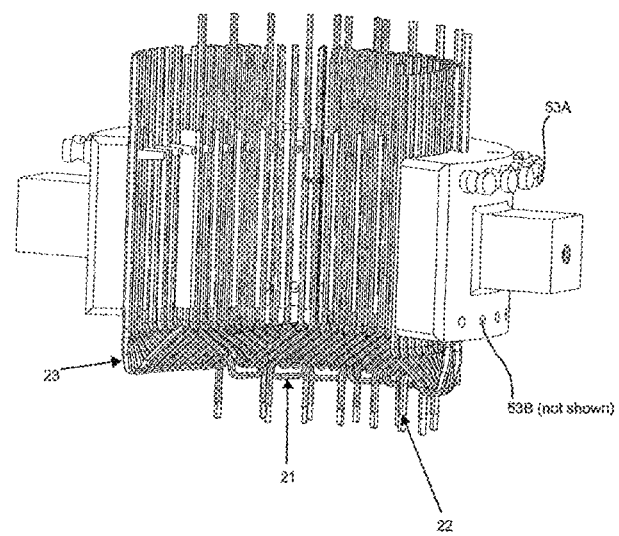
FIG. 14 is a perspective view of the fixture of FIG. 8 with two rows of retaining pins and a complete set of hairpin conductors.

After all the hairpin conductors (21, 22, 23) for the segment are arranged in the sub-assembly fixture (53A), at least some of the retaining pins (53) are rotated 90 degrees so that the notches (60) of the pins align with the individual layers of hairpin conductors to secure them. After securing the hairpin conductors, the sub-assembly fixture (52A) and preferably the support/press plate (51A) are rotated to a vertical orientation as depicted in FIG. 13 and FIG. 14.

Figure 5:
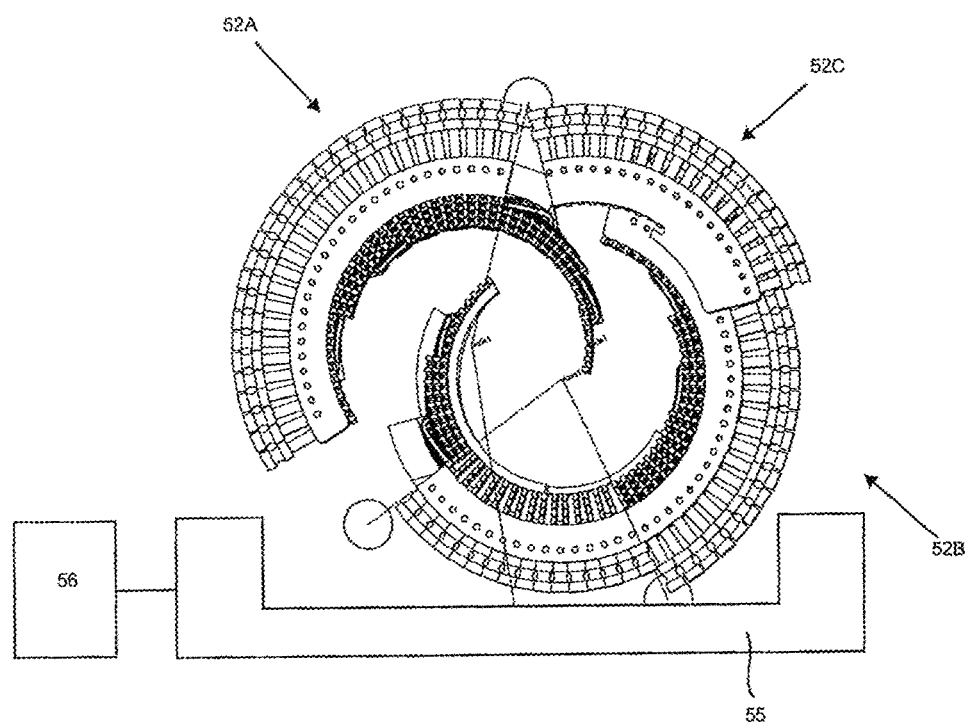
FIG. 5 is a plan view of a pair of sub-assembly fixtures housing hairpin conductors.
Figure 6:
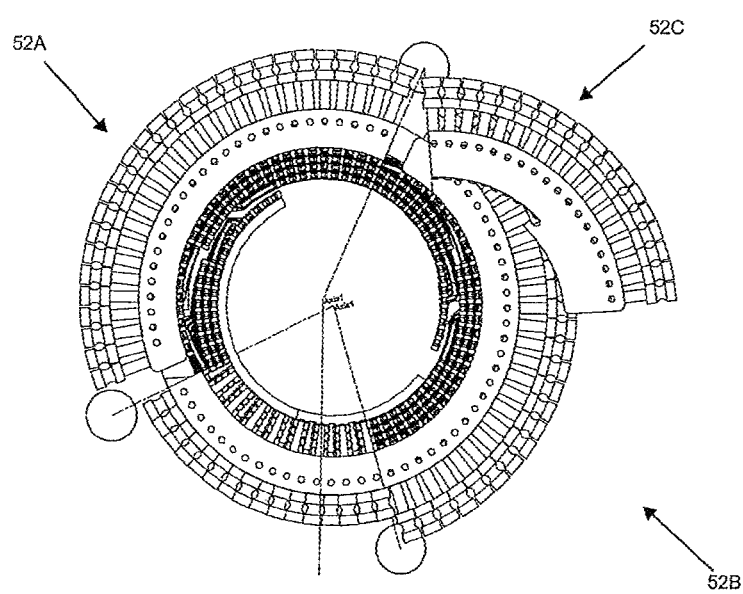
FIG. 6 is a plan view of the sub-assembly fixtures of FIG. 5 partially engaged.
Figure 7:
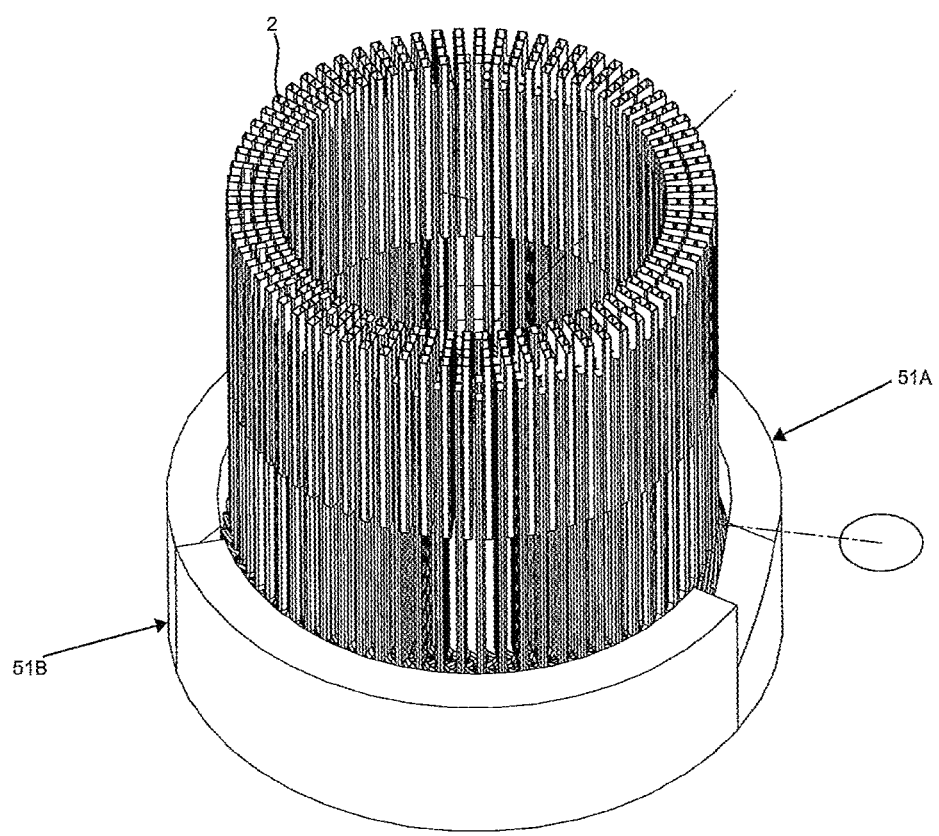
FIG. 7 is a perspective view of a set of hairpin conductors woven prior to insertion into the stator core.

FIG. 5, FIG. 6, and FIG. 7 collectively show the meshing or engagement of two segments of hairpin conductor sub-assembly fixtures. In the figures, two sub-assembly, or sub-assembly fixtures (52A, 52B) each hold or constrain the pre-arranged hairpin conductors (21, 22, 23) vertically with the conductor ends facing upward. These sets of hairpin conductors are arranged or pre-arranged within the sub-assembly fixtures in an automated fashion such as disclosed above with respect to FIGS. 9 to 12. Additionally, in some embodiments, there may be an additional sub-assembly fixture (52C), which meshes or engages with the other sub-assembly fixtures to support the hairpin conductors and meshing and may be removed or engaged as a part of the meshing of the other sub-assembly fixtures. Although several sub-assembly fixtures are shown, any number of sub-assembly fixtures are contemplated as long as they can mesh to form the layered conductor assembly (2).

The two fixtures (52A, 52B) are slid toward each other as shown in FIG. 5. In a preferred embodiment, the sub-assembly fixtures are semi-circular in structure. The angular shape of the hairpin conductors (21, 22, 23) on the crown end permit the meshing of the conductors on each end of the fixtures when slid axially relative to each other. The angle of approach of the sub-assembly fixtures may vary based on the individual design of the sub-assembly fixtures. In meshing the two fixtures, the two fixtures are preferably mounted to an apparatus (55) under the control of a central processing unit (56) which performs the meshing of the two fixtures, thereby creating, or forming, the layered conductor assembly.

FIG. 6 shows the two sub-assembly fixtures in a partially meshed position. A perspective view of the layered conductor assembly without the sub-assembly fixtures is shown in FIG. 7.

After the layered conductor assembly has been arranged or formed (such as shown in FIG. 7), the layered conductor assembly may be inserted into the stator core in an automated manner. Although not shown in FIG. 7, the hairpin conductor sub-assembly fixtures are part of the process for inserting the layered conductor assembly into the slots of the stator core.

The location of the retaining pins (53) preferably provide sufficient accuracy radially, axially, and circumferentially to permit the meshed pair of hairpin conductor sub-assemblies to be pressed into the stator core (1) with the paper insulators (3) without damaging neither the paper insulators (3) nor the hairpin conductors (21, 22, 23). Alternatively, the stator core may be manipulated onto the stationary layered conductor assembly.

In an automated manner, the stator core and the sub-assembly fixtures are brought together, such that the layered conductor assembly is introduced within the slots of the stator core. This may be performed by the apparatus (55) or by an apparatus directed at moving the sub-assembly fixtures in relation to the stator core. In one embodiment, the slots (4) of the stator core (1) can be initially engaged with the layered conductor assembly by method of a vertical press upward against the support/press plate (51A). In another embodiment, the layered conductor assembly (2) is pressed upward just until the connector ends of the hairpin conductors (21, 22, 23) are introduced into the paper insulators (3) in the stator core slots (4). Once the slots are engaged with the conductors, the sub-assembly fixture (52A) of fixtures can be retracted to allow a full-depth press of the hairpin conductors (21, 22, 23) into the slots. Retraction of the sub-assembly fixtures allows the stator core (1) to be assembled onto the layered conductor assembly (2).

Figure 16A:
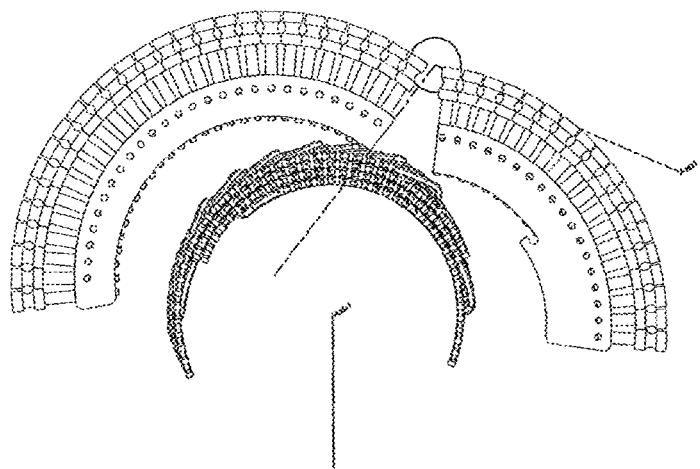
FIG. 16 is a plan view of the clam-shell function of the sub-assembly fixture during the extraction process.
Figure 16B:
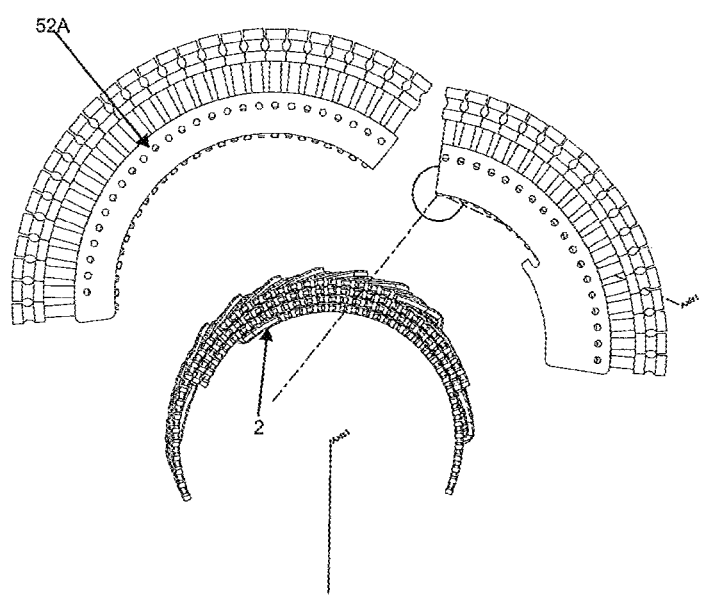

Once the hairpin conductors have been pressed into the slots, the retaining pins (53) are preferably rotated 90 degrees so that the milled flats opposite the notches (60) are parallel to the vertical straight sections of the hairpin conductors (21, 22, 23). The hairpin conductor positions are maintained at this point as the hairpin conductors are constrained by the slots (4). The retaining pins (53) are then retracted axially outward and the two halves of the sub-assembly fixtures (52A) are opened sufficiently so that when slid axially away from the hairpin conductor assembly (2) the ends of the sub-assembly fixture (52A) clear the hairpin conductor assembly. A schematic diagram of the sub-assembly fixture retraction (without the stator core) is shown in FIG. 16. After the layers of hairpin conductors are fully engaged with the slots and the pins rotated, the sub-assembly fixtures are urged away from the stator core in a direction shown by the arrows of FIG. 16. In the current embodiment, because the sub-assembly fixtures (52A, 52B) are greater than 180 degrees, a clam-shell feature opens the fixtures just enough to laterally clear the hairpin assembly.

The depth within which the individual hairpin conductors are (21, 22, 23) are located the stator core slots (4) is achieved, or controlled, by the support/press plate (51A, 51B). Based on control signals, the apparatus used for inserting the hairpin conductors into the slots may be also instructed with a depth of insertion of the pins. The pattern of the plate corresponds to the crown-side pattern of the hairpin conductor as depicted in FIG. 13.

Figure 17:
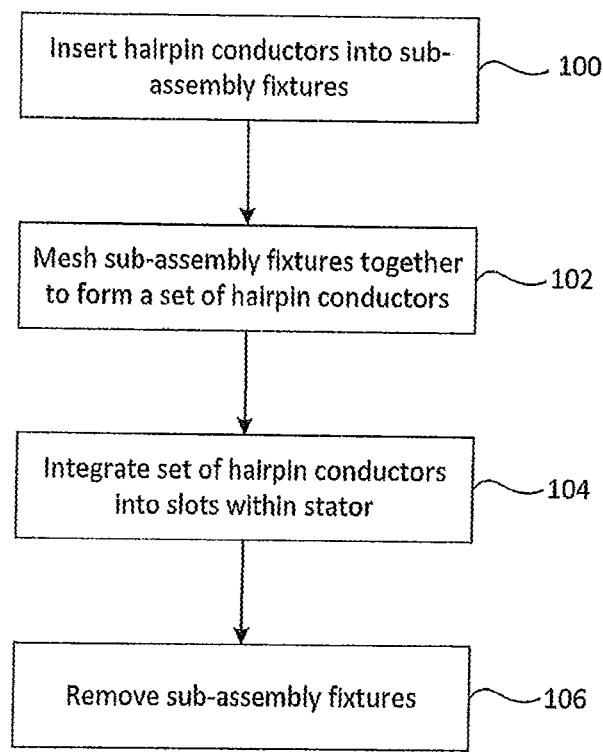
FIG. 17 is a flowchart outlining a method of inserting hairpin conductors into a stator core.
Figure 18:
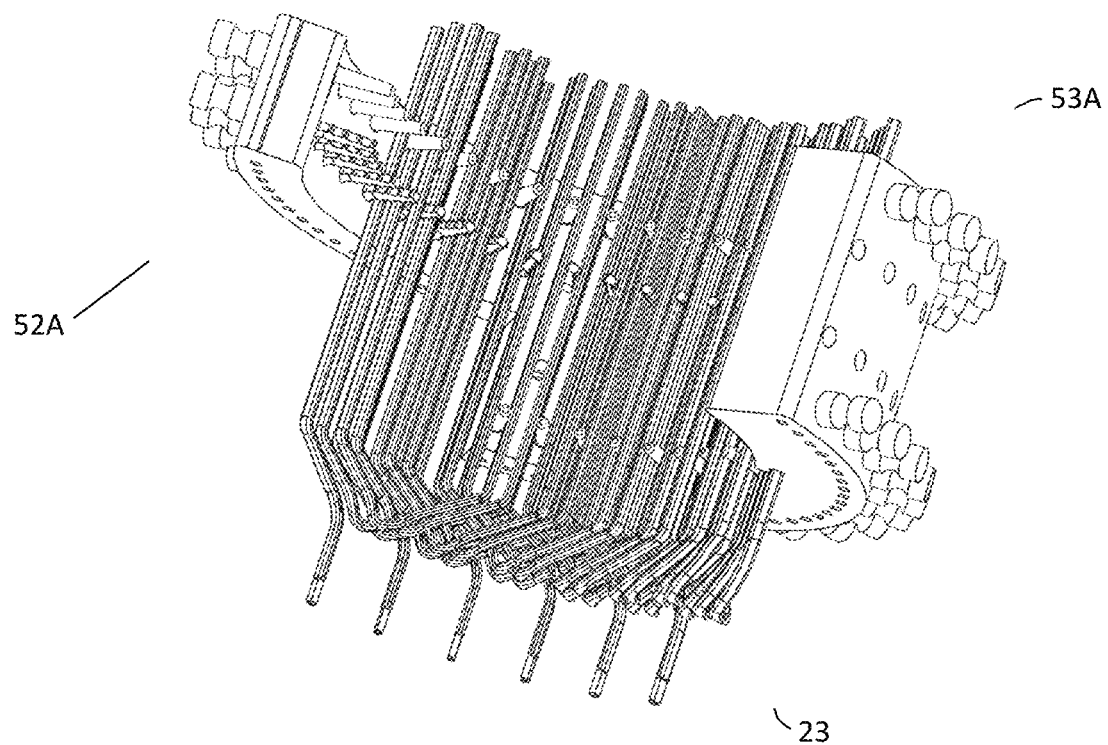
FIGS. 18 to 23 are schematic diagrams of another embodiment of an apparatus for inserting a set of hairpin conductors into a stator core.
Figure 19:
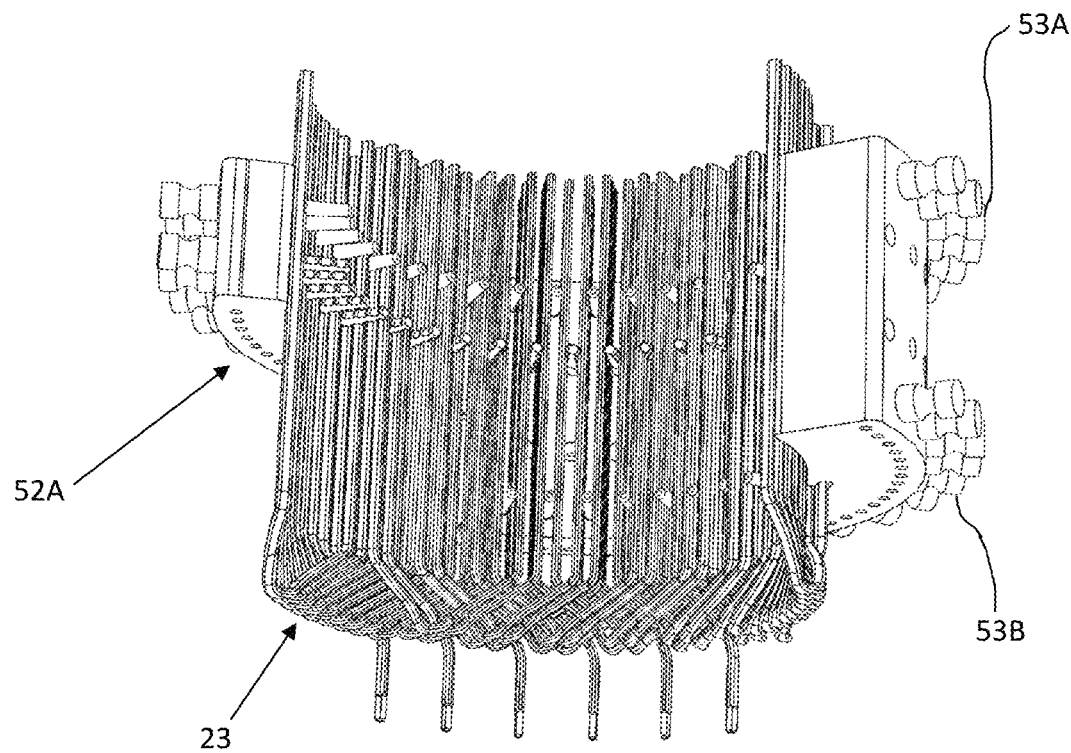
Figure 20:
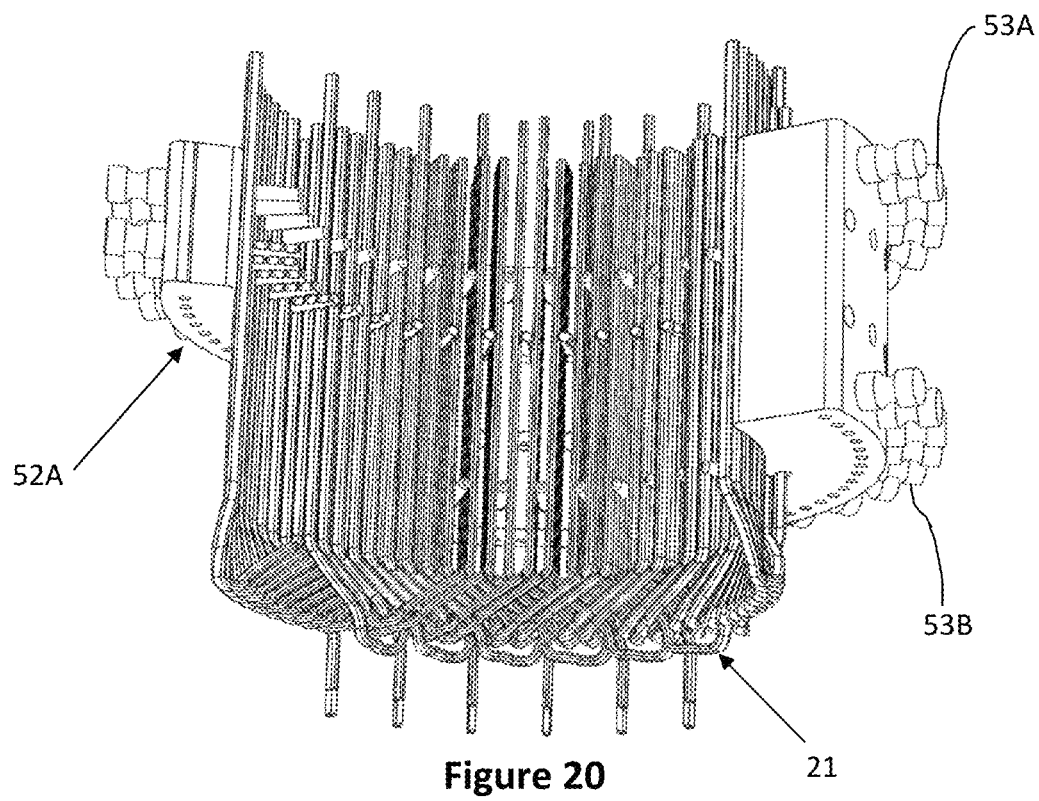
Figure 21:
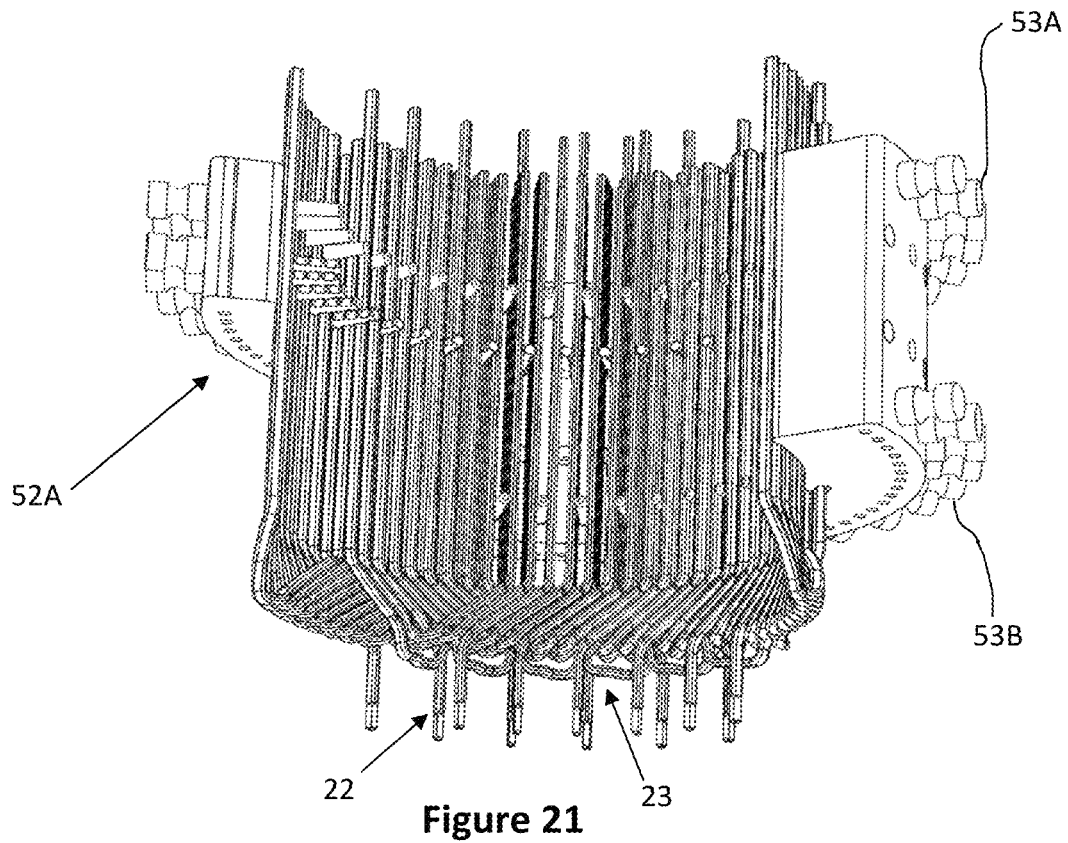
Figure 22:
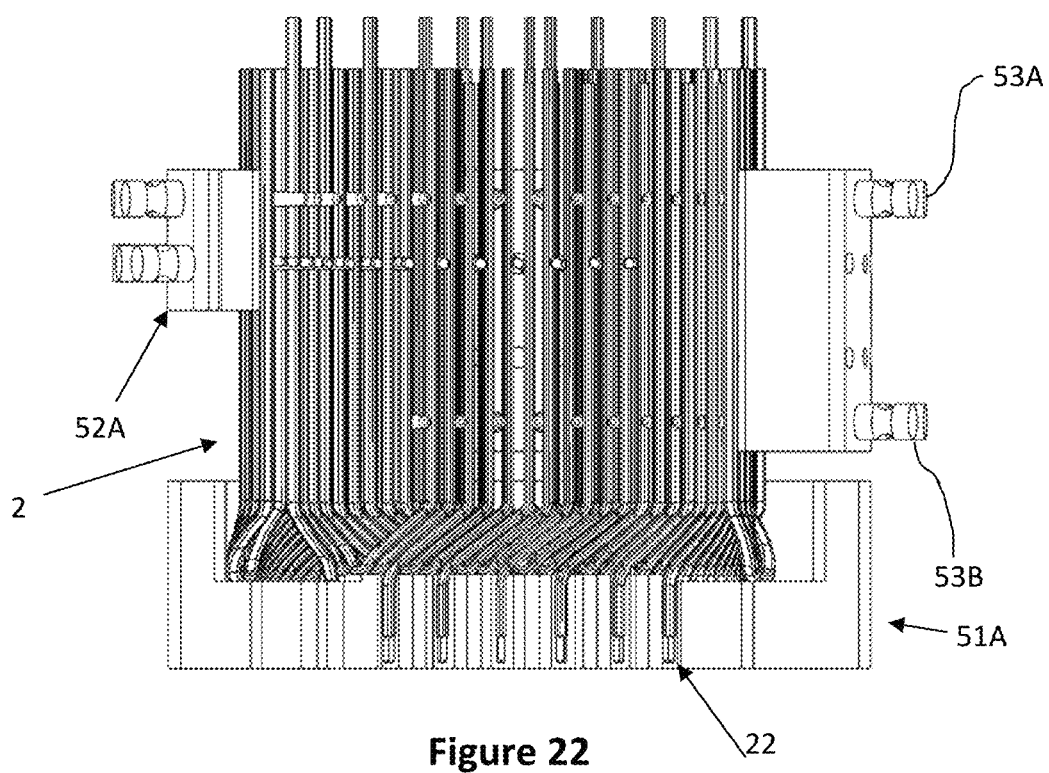
Figure 23:
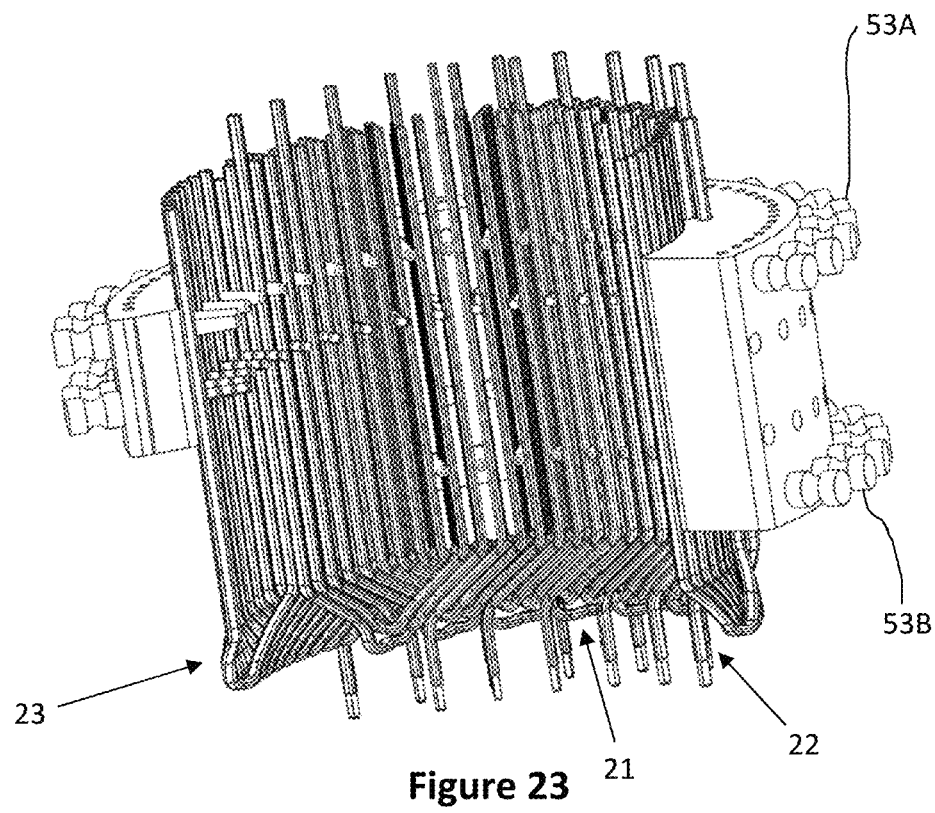

Turning to FIG. 17, a flowchart outlining a method of hairpin conductor assembly into a stator core is shown. Initially, the hairpin conductors are inserted, arranged, or pre-arranged (100) into separate sub-assemblies. An embodiment of this is discussed above with respect to FIGS. 9 to 12. The sub-assemblies are then meshed so that the hairpin conductors can form a layered conductor assembly (102). An embodiment of this is discussed above with respect to FIGS. 5 to 7. The sub-assembly fixtures are then moved in relation to the stator core such that the layered conductor assembly is introduced into or integrated with the slots of the stator (104). An embodiment of this is discussed above with respect to paragraph 55. Finally, the sub-assembly fixtures (106) are removed. An embodiment of this is discussed with respect to FIG. 16.

FIGS. 18 to 23 are schematic diagrams of another embodiment of an apparatus for inserting a layered conductor assembly into a stator core and, in particular, sub-assembly fixtures. FIGS. 18 to 23 are similar to FIGS. 9 to 14, however FIGS. 18 to 23 show an alternate embodiment having additional holes for retaining pins as well as illustrating a lower set of retaining pins.

Figure 24:
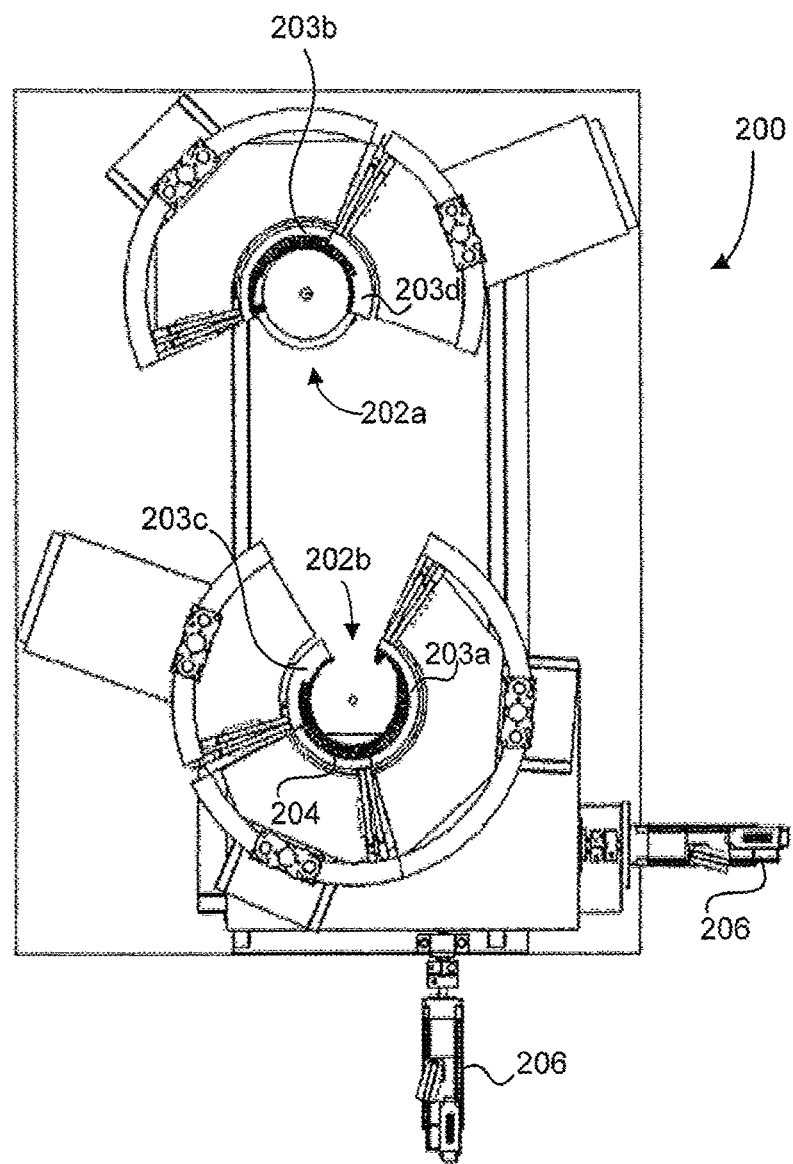
FIG. 24 is a plan view of another embodiment of an apparatus for inserting a set of hairpin conductors into a stator core.
Figure 25:
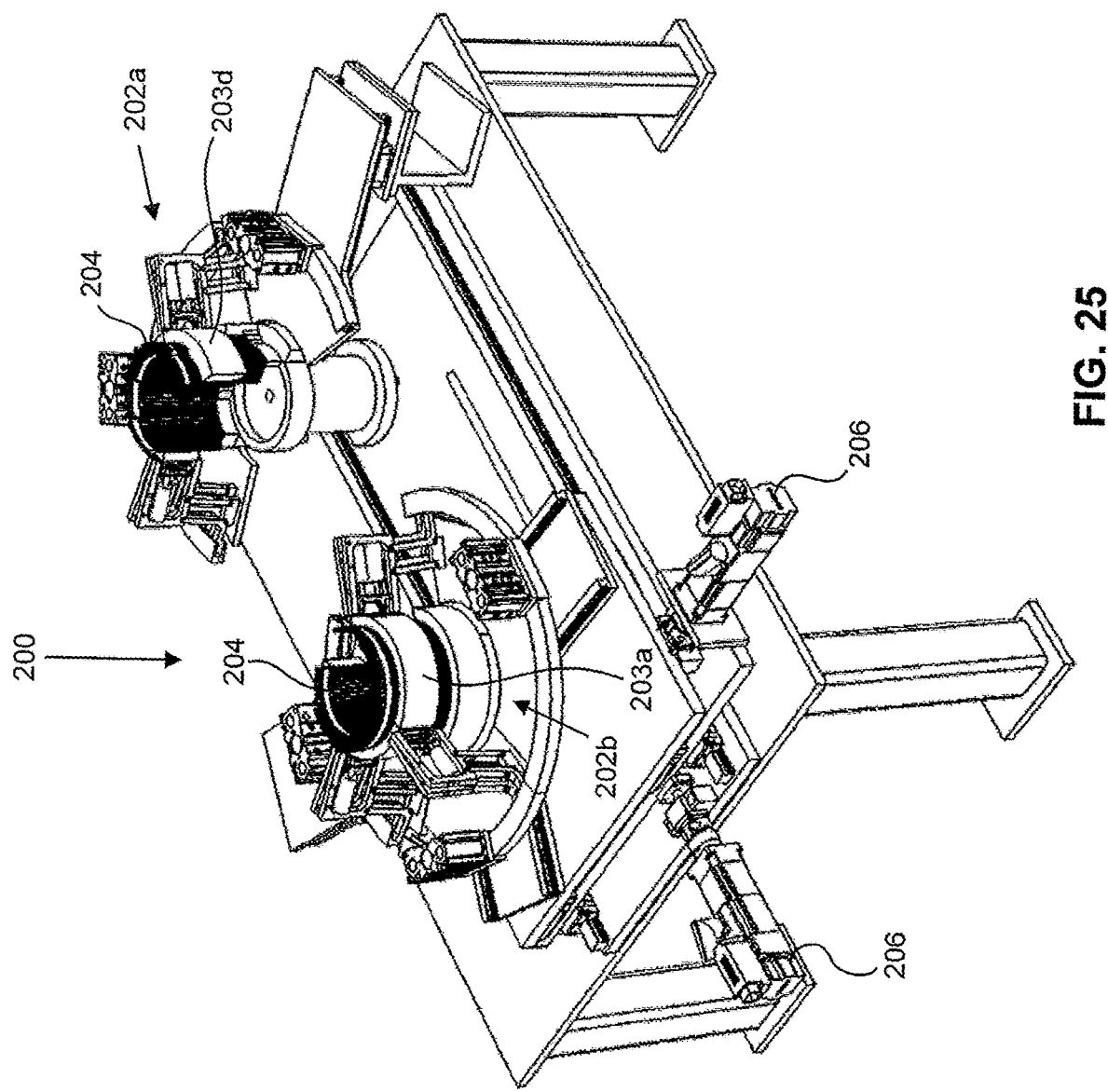
FIG. 25 is a perspective view of the embodiment of FIG. 24.

FIG. 24 is a top plan view and FIG. 25 is a perspective view of another embodiment of a system and apparatus for inserting hairpin connectors into a stator core. In this embodiment, the apparatus (200) includes sub-assembly fixtures (202a, 202b) that each hold a portion of a layered conductor assembly (204). The sub-assembly fixtures (202) are generally similar to the sub-assembly fixtures discussed above and may include sub-assembly fixtures (203a, 203b) as well as assisting sub-assembly fixtures (203c and 203d). The apparatus (200) further includes a fixture assembly actuator (206), such as servo motors (206), for assisting in the movement of the sub-assembly fixtures (202a, 202b) in relation to each other. In use, the servo motors move the sub-assembly fixtures in relation to each other in order to mesh the sub-assembly fixtures and produce a complete layered conductor assembly (204). The operation and movement of the sub-assembly fixtures to provide the meshing is described herein, in particular with reference to FIGS. 5 and 6.

Figure 26:
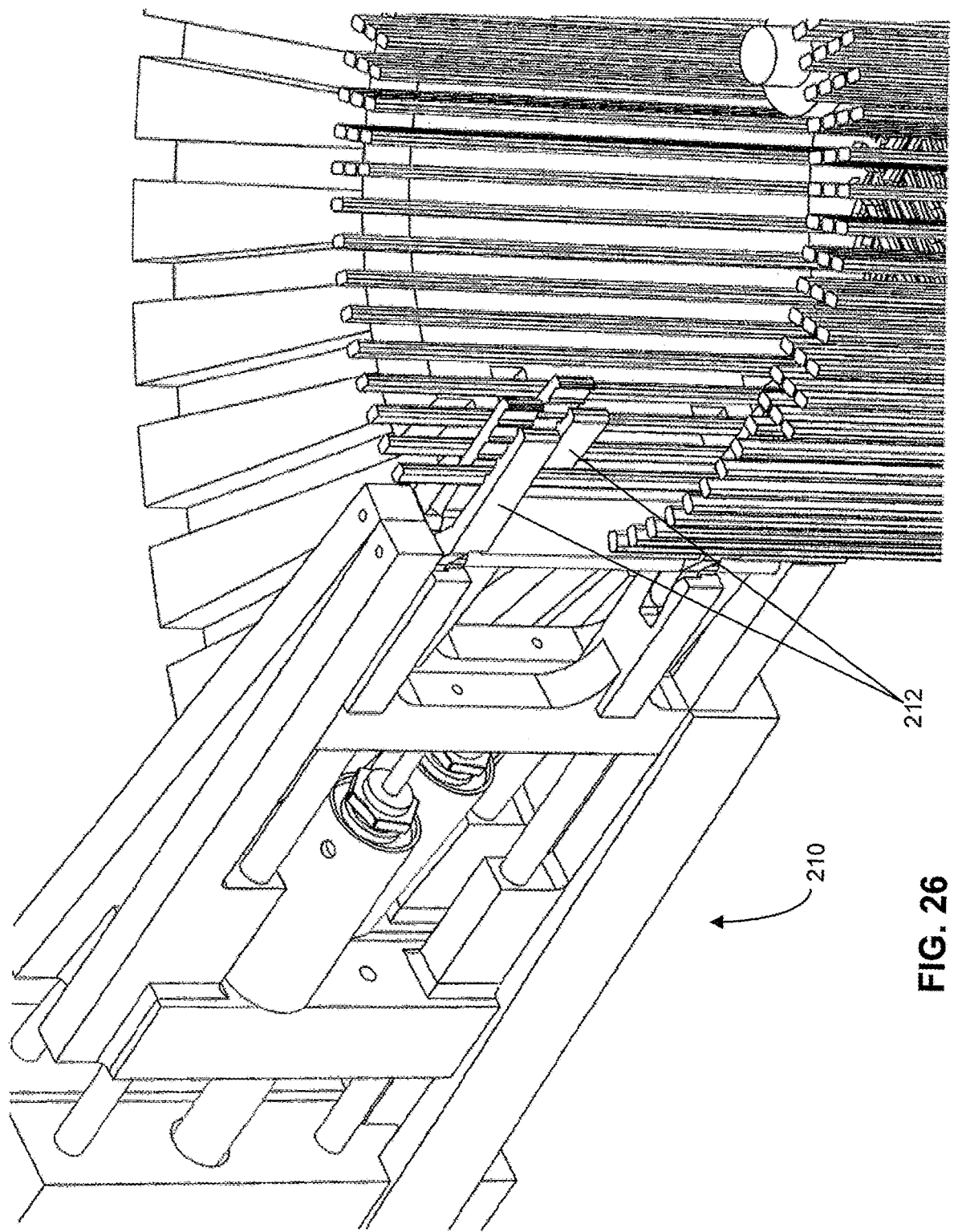
FIG. 26 is a perspective view of a hairpin gripping apparatus in an open position.
Figure 27:
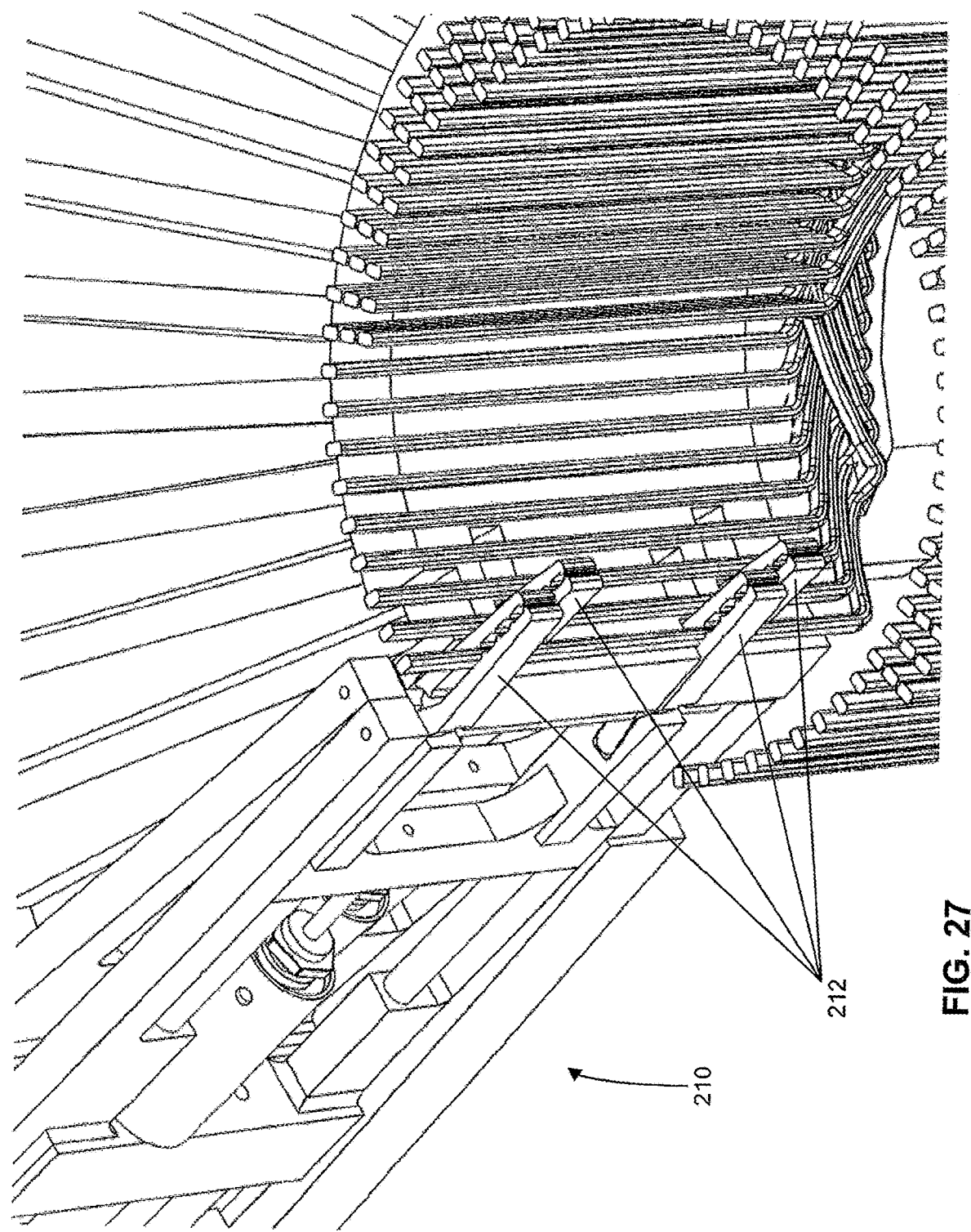
FIG. 27 is a perspective view of the hairpin gripping apparatus of FIG. 26 in a closed position.
Figure 28:
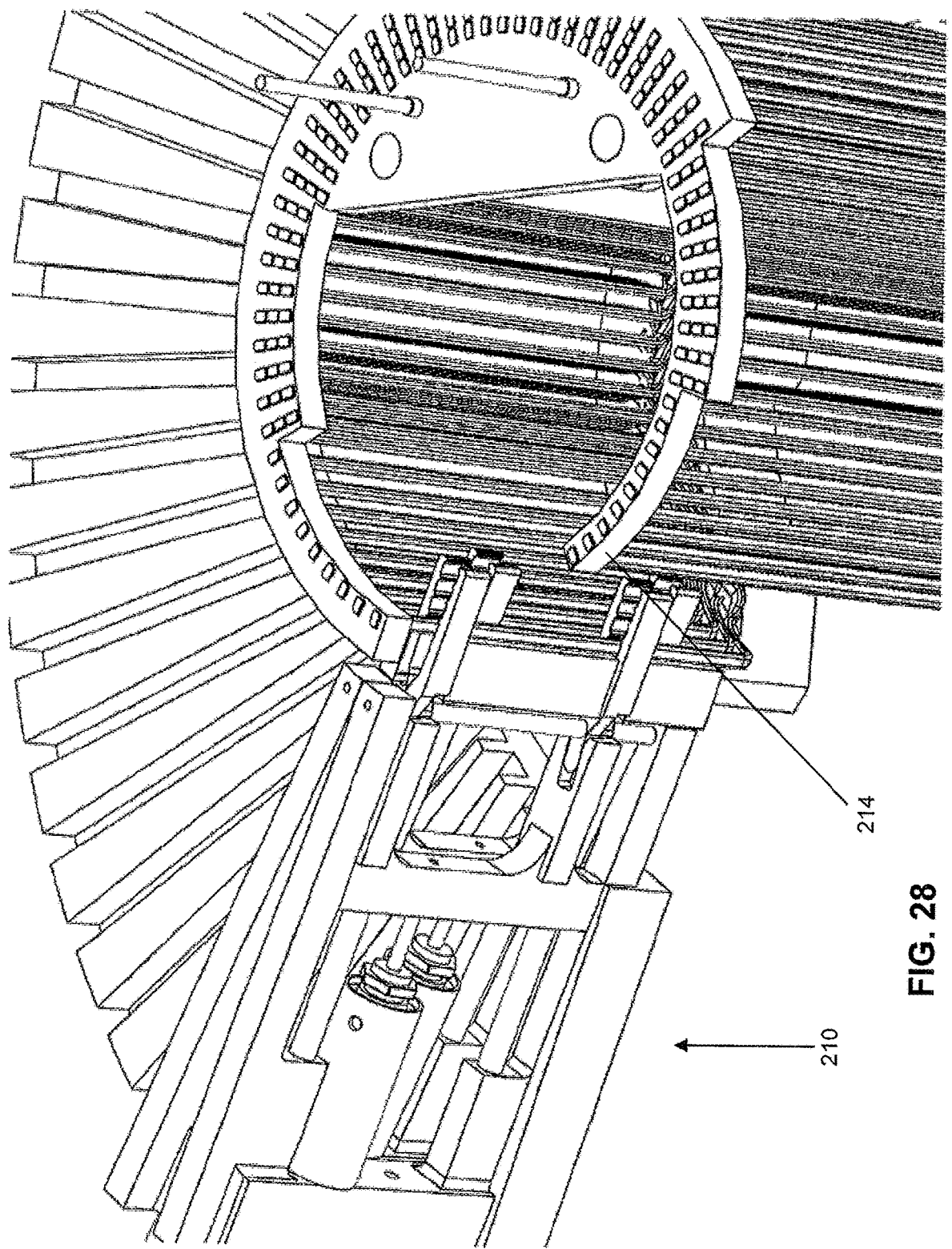
FIG. 28 is a perspective view of the hairpin gripping apparatus of FIG. 26 with a retaining plate.

FIGS. 26 and 27 are exploded perspective views of an embodiment of a hairpin gripping apparatus (210) for use with the system and apparatus for inserting hairpin conductors (200). The gripping apparatus (210) includes a set of individual hairpin grippers (212) which are shown in an open position (FIG. 26) and a closed position (FIG. 27). Although only two are shown in FIG. 26 and 4 in FIG. 27, there may be a plurality of hairpin gripping apparatuses (210) surrounding the sub-assembly fixtures in order to hold the hairpin conductors in place, somewhat similar to the retaining pins (53) described above. The hairpin grippers (212) pass through holes in the sub-assembly fixtures and may be driven by a cam that is actuated by a servo motor or the like. FIG. 28 is a perspective view of the hairpin gripping apparatus (210) with an optional retaining plate (214). The retaining plate (214) may be used to temporarily secure the arrangement of the hairpin conductors within a sub-assembly fixture (202a or 202b) as the sub-assembly fixtures are meshed or engaged together.

Figure 29:
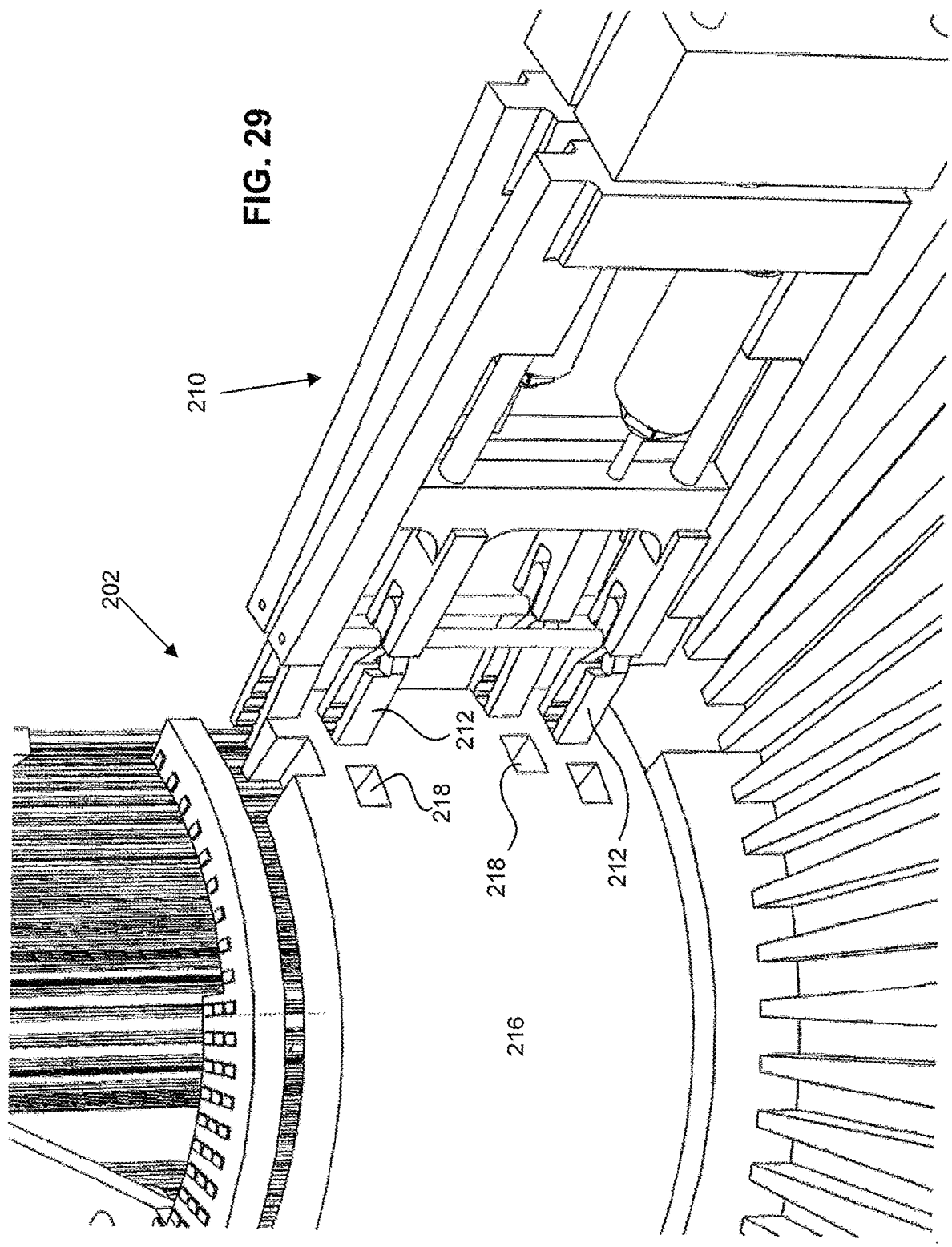
FIG. 29 is another perspective view of the apparatus of FIG. 24.

FIG. 29 is a view of a backing plate (216) of the sub-assembly fixture (202). The backing plate (216) includes a set of holes (218) for receiving the individual hairpin grippers (212) in order for the hairpin grippers to access the hairpin conductors. In the current view, the hairpin grippers (212) are shown as being retracted from the hairpin conductors. In operation, the hairpin grippers are preferably retracted after the sub-assembly fixtures are merged together and the layered conductor assembly has been introduced into the stator core.

Figure 30:
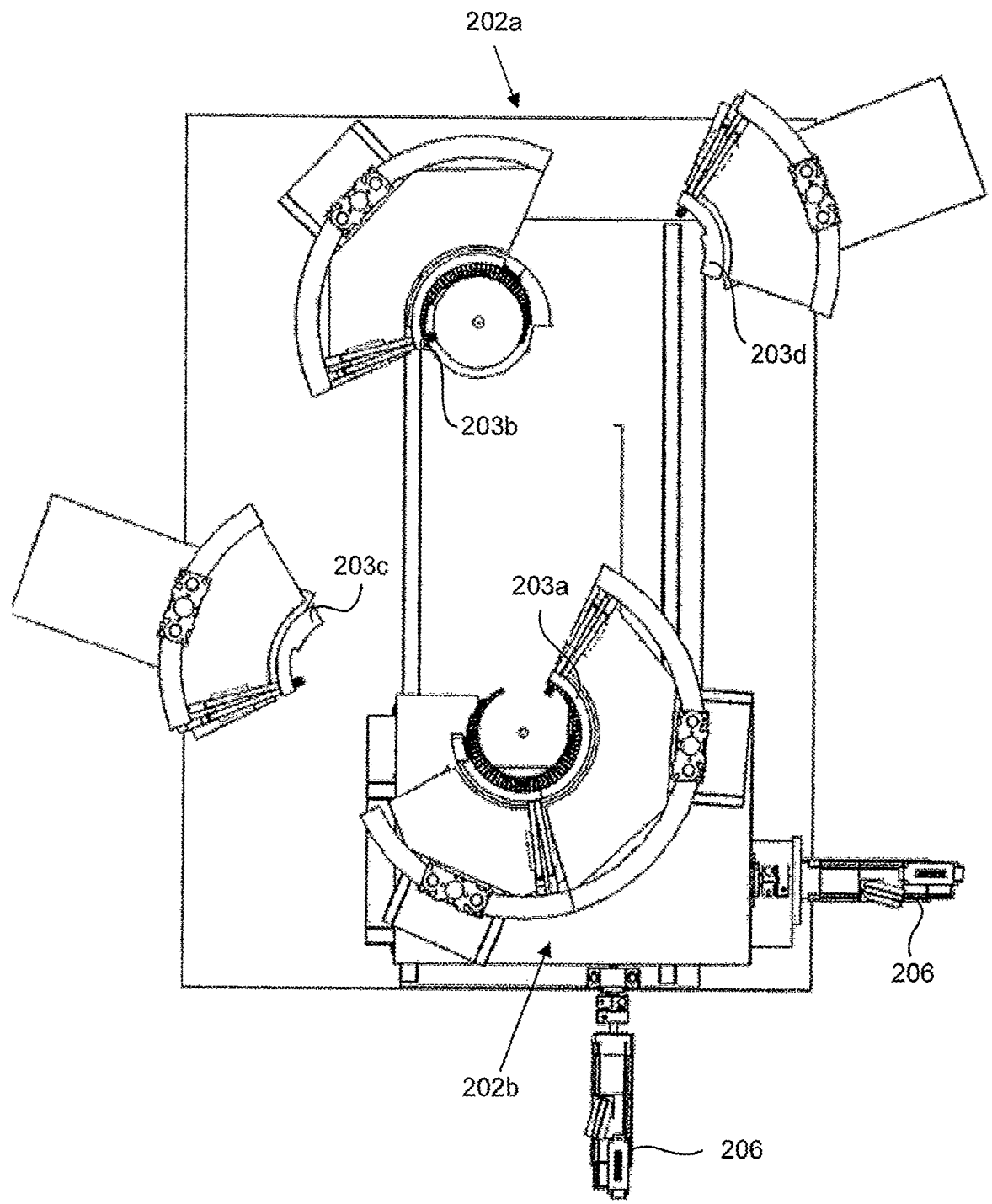
FIG. 30 is a plan view of the apparatus of FIG. 24 when ready for meshing.

FIG. 30 is a top plan of the apparatus of FIG. 24 showing the sub-assembly fixtures (202a, 202b) when ready for meshing. In this embodiment, assisting sub-assembly fixtures (203c, 203d) have been moved to the side so that sub-assembly fixtures (203a, 203b) can be moved toward one another and meshed together to provide the layered conductor assembly.

Figure 31:
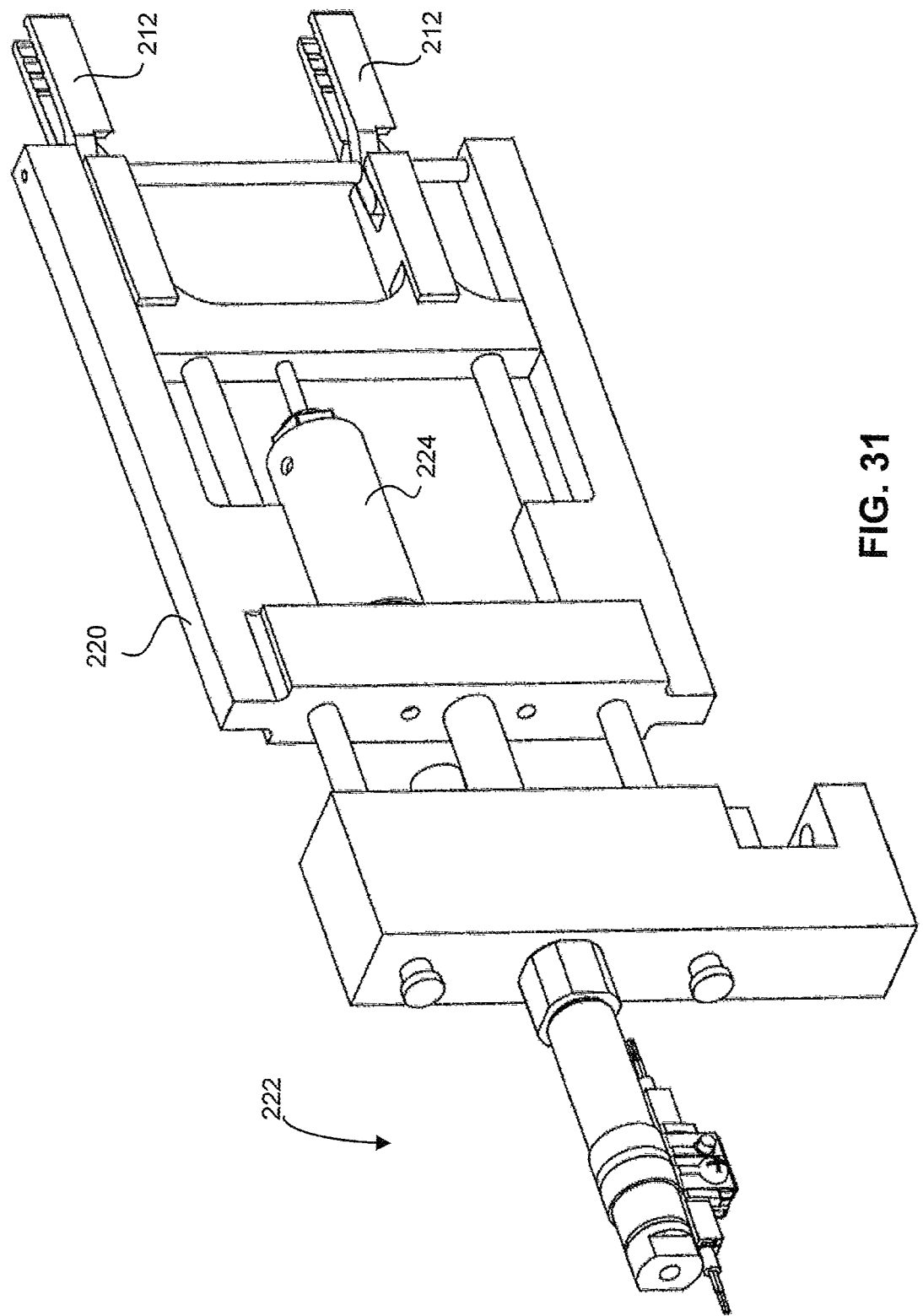
FIG. 31 is a perspective view of an embodiment of a hairpin gripping apparatus.

FIG. 31 is a perspective view of the hairpin gripping apparatus of FIG. 26. In this figure, the details of the hairpin gripping apparatus (210) can be seen in more detail. The gripping apparatus (210) includes one or more hairpin grippers (212) that are connected to a frame (220). The frame (220) is connected to a motor (222), such as a servo, that advances and retracts the hairpin gripping apparatus into and out of the sub-assembly fixture. A hairpin gripper motor (224), for example, a servo, operates to open and close the hairpin grippers (212).

Figure 32:
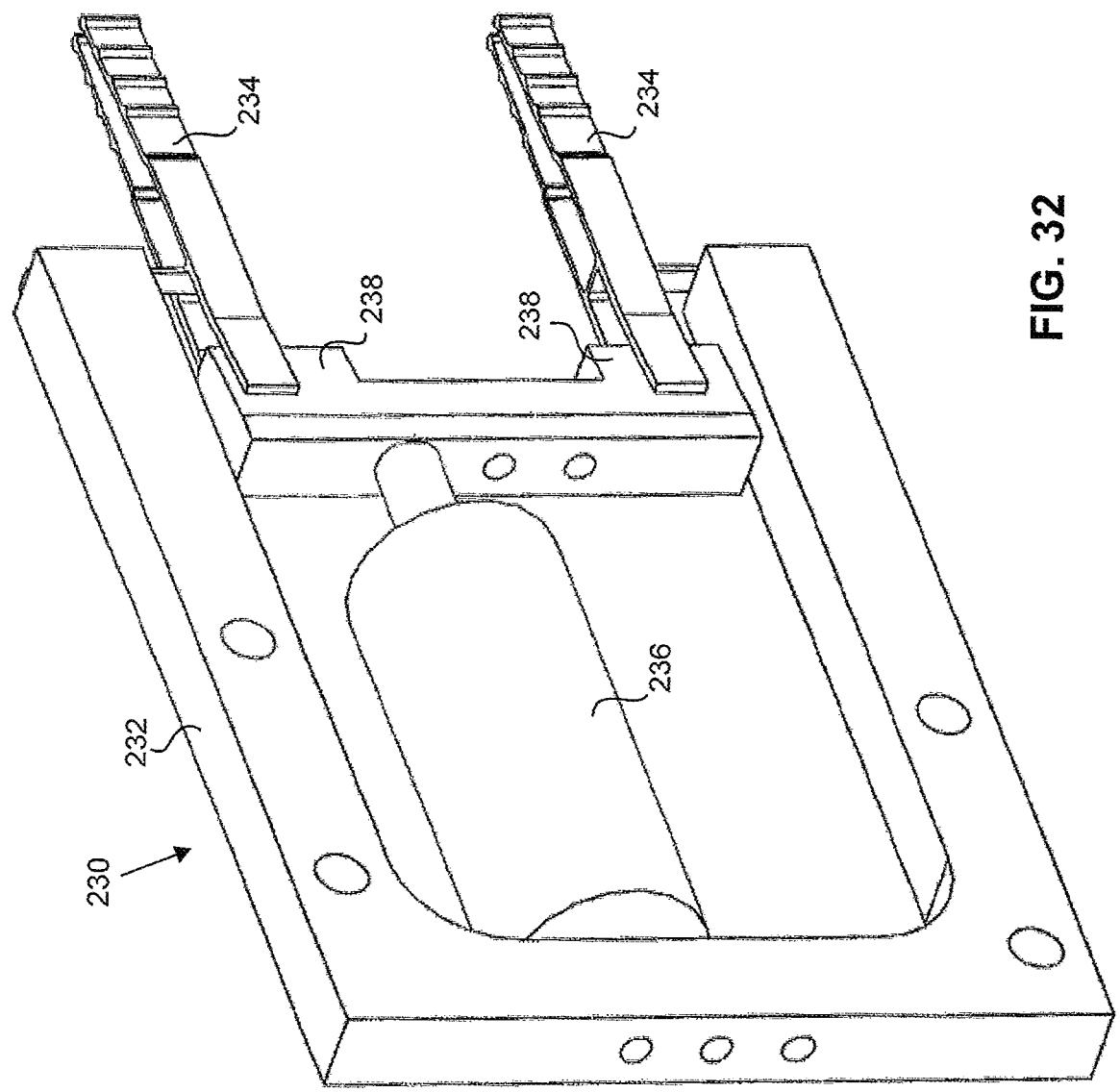
FIG. 32 is a perspective view of another embodiment of a hairpin gripping apparatus.

Turning to FIG. 32, another embodiment of a hairpin gripping apparatus is shown. In this embodiment, the hairpin gripping apparatus (230) includes a frame (232), one or more hairpin grippers (234) and a hairpin gripper motor (236). The hairpin gripper motor (236) operates to control a wedge (238) to open and close the tweezer-style hairpin grippers (234). Although not shown, the hairpin gripping apparatus (230) is preferably controlled by another motor that advances and retracts the hairpin gripping apparatus (230) into and out of a sub-assembly fixture.

Figure 33:
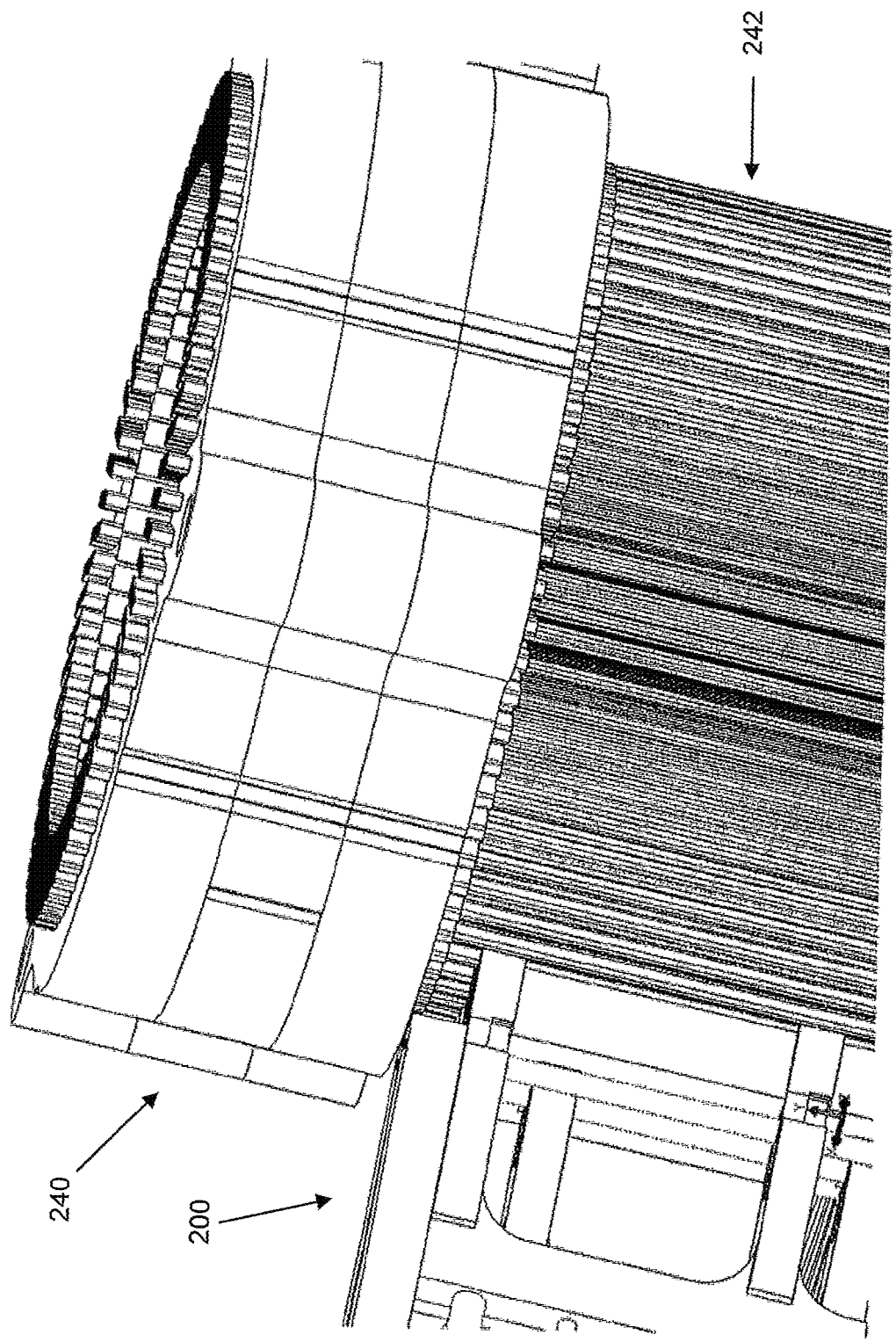
FIG. 33 is a schematic view of the insertion to a stator core.

FIG. 33 shows a perspective cut-away view of the apparatus of FIG. 24 when the layered conductor assembly (242), held by the meshed sub-assembly fixtures (203a, 203b), is being introduced into a stator core (240). Initially, the stator core (240) is moved by a movement apparatus toward the layered conductor assembly (242) (or vice versa) along a common central axis. For example, a pressure plate such as described herein may push the layered conductor assembly, held by the sub-assembly fixtures, toward the stator core. After the top, or tip, of the hairpin conductors have been introduced into appropriate locations on the stator core (240), the sub-assembly fixtures (203a, 203b) can be retracted or moved away, for example by the fixture assembly actuator, to provide the necessary clearance for the stator core to be fully pressed down such that the hairpin conductors are fully inserted into the stator core.

Although the present disclosure has been illustrated and described herein with reference to various embodiments and specific examples thereof, it will be readily apparent to those of ordinary skill in the art that the elements of the embodiments may be combined in other ways to create further embodiments and also other embodiments and examples may perform similar functions and/or achieve like results. All such equivalent embodiments and examples are within the spirit and scope of the present disclosure as defined by the claims.

In the preceding description, for purposes of explanation, numerous details may be set forth in order to provide a thorough understanding of the embodiments. However, it will be apparent to one skilled in the art that these specific details may not all be required. In other instances, well-known structures may be shown in block diagram form in order not to obscure the understanding. For example, specific details are not provided as to whether elements of the embodiments described herein are implemented as a software routine or computer readable code to be executed by a processor or as a hardware circuit, firmware, or a combination thereof.

We claim:

1. A method of assembling a plurality of hairpin conductors with a stator core, the method comprising:
    arranging the plurality of hairpin conductors into two or more sub-assembly fixtures, wherein the plurality of hairpin conductors are arranged in the two or more sub-assembly fixtures in two or more layers;
    activating a retaining mechanism to hold the plurality of hairpin conductors in place within the sub-assembly fixtures;
    meshing the two or more sub-assembly fixtures together to bring the hairpin conductors into alignment and form a layered conductor assembly;
    introducing the layered conductor assembly into the stator core by advancing the two or more sub-assembly fixtures toward the stator core in alignment with locations on the stator core for the layered conductor assembly; and
    after introducing the layered conductor assembly into the stator core, deactivating the retaining mechanism to release the layered conductor assembly from the two or more sub-assembly fixtures.

2. A method according to claim 1, wherein the arranging comprises:
    placing a first layer of the plurality of hairpin conductors within at least one of the two or more sub-assembly fixtures; and
    arranging at least a second layer of the plurality of hairpin conductors within at least another one of the two or more sub-assembly fixtures.

3. A method according to claim 2, wherein the layers of hairpin conductors are layered in accordance with a predetermined design of the stator core.

4. A method according to claim 1, wherein the meshing comprises axially sliding the two or more sub-assembly fixtures towards each other along a predetermined angle of approach.

5. A method according to claim 1, wherein the plurality of hairpin conductors comprises individual hairpin conductors, introducing the layered conductor assembly comprises aligning the individual hairpin conductors with designated positions on the stator core, and wherein introducing further comprises pushing the layered conductor assembly toward the stator core such that the individual hairpin conductors enter into the designated positions on the stator core.

6. A method according to claim 1, further comprising:
    partially inserting the layered conductor assembly into the stator core while the sub-assembly fixtures are meshed together;
    removing the sub-assembly fixtures; and
    inserting the layered conductor assembly fully into the stator core after removing the sub-assembly fixtures.

7. A method according to claim 6, wherein the removing comprises radially separating the sub-assembly fixtures.

8. A system for assembling a plurality of hairpin conductors with a stator core, the system comprising:
    two or more sub-assembly fixtures for receiving the plurality of hairpin conductors, wherein each of the two or more sub-assembly fixtures are configured to:
        mesh with one another to bring the hairpin conductors into alignment and produce a layered conductor assembly; and
        be introduced into the stator core when the layered conductor assembly is advanced toward the stator core in alignment with locations on the stator core for the layered conductor assembly; and
    a retaining mechanism comprising:

an activated state for holding the plurality of hairpin conductors in place within the sub-assembly fixtures while forming the layered conductor assembly; and a deactivated state for releasing the plurality of hairpin conductors after the layered conductor assembly is introduced into the stator core.

9. A system according to claim 8, further comprising a movement apparatus for moving the meshed two or more sub-assembly fixtures toward the stator core such that the layered conductor assembly is introduced into the stator core.

10. A system according to claim 9, wherein the movement apparatus comprises a pressure plate for urging the two or more sub-assembly fixtures and the layered conductor assembly towards the stator core such that the layered conductor assembly is inserted to designated slots on the stator core.

11. A system according to claim 8, further comprising a fixture assembly actuator for:

meshing the two or more sub-assembly fixtures together to form the layered conductor assembly; and retract the two or more sub-assembly fixtures after introducing the layered conductor assembly into the stator core.

* * * * *